United States Patent
Ma et al.

(10) Patent No.: US 7,323,838 B2
(45) Date of Patent: Jan. 29, 2008

(54) MOTOR CONTROL METHOD AND DEVICE THEREOF

(75) Inventors: Wen-Chuan Ma, Taoyuan Hsien (TW); Yen-Hung Chen, Taoyuan Hsien (TW); Po-Tsun Kuo, Taoyuan Hsien (TW); Chun-Lung Chiu, Taoyuan Hsien (TW); Wen-Shi Huang, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 16 days.

(21) Appl. No.: 11/472,481

(22) Filed: Jun. 22, 2006

(65) Prior Publication Data

US 2007/0013339 A1    Jan. 18, 2007

(30) Foreign Application Priority Data

Jul. 15, 2005    (TW) .............................. 94124128 A

(51) Int. Cl.
*H02P 7/00*    (2006.01)
(52) U.S. Cl. ...................... 318/268; 318/439; 318/599; 318/603; 388/811; 315/247
(58) Field of Classification Search ........ 318/280–286, 318/268, 439, 599, 603; 388/811; 315/247
See application file for complete search history.

(56) References Cited

U.S. PATENT DOCUMENTS

| | | | | |
|---|---|---|---|---|
| 5,216,346 | A * | 6/1993 | Murakami | 318/603 |
| 6,049,474 | A * | 4/2000 | Platnic | 363/98 |
| 6,265,841 | B1 * | 7/2001 | Buthker | 318/439 |
| 6,515,443 | B2 * | 2/2003 | Kelly et al. | 318/599 |
| 7,245,096 | B2 * | 7/2007 | Echazarreta | 318/268 |
| 2002/0171386 | A1 * | 11/2002 | Kelly et al. | 318/599 |
| 2007/0019935 | A1 * | 1/2007 | Hsieh et al. | 388/811 |
| 2007/0025707 | A1 * | 2/2007 | Lin et al. | 388/811 |
| 2007/0114949 | A1 * | 5/2007 | Yu et al. | 315/247 |

* cited by examiner

*Primary Examiner*—Paul Ip
(74) *Attorney, Agent, or Firm*—Birch, Stewart, Kolasch & Birch, LLP

(57) ABSTRACT

A motor control method and device. The motor control device includes a programmable integrated circuit (IC) receiving a phase signal, the phase of which is consistent with the rotation phase of a coil of the motor. The programmable IC generates a duty-cycle signal in accordance with the period of the phase signal. The duty-cycle signal comprises a rising segment and a falling segment and when the phase signal changes phase, the duty cycle represented by the duty-cycle signal is a first duty cycle, allowing the input power of the motor remain at a minimum. The duty-cycle signal is input to the coil, controlling the coil on and off and, thereby rotating the motor.

31 Claims, 28 Drawing Sheets

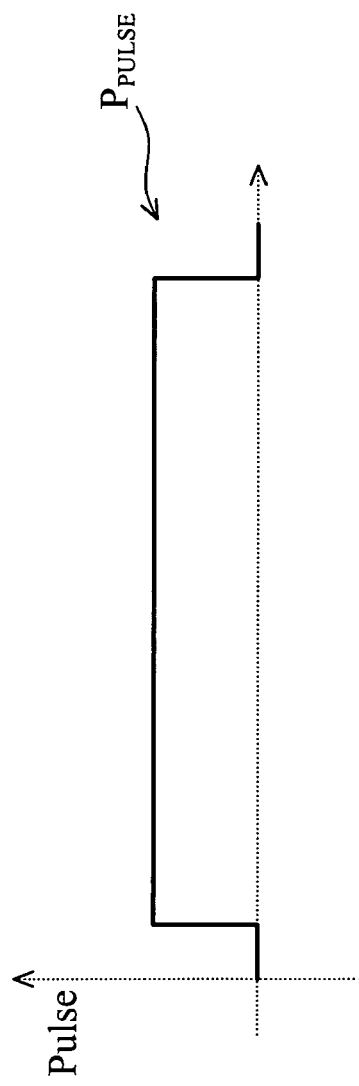
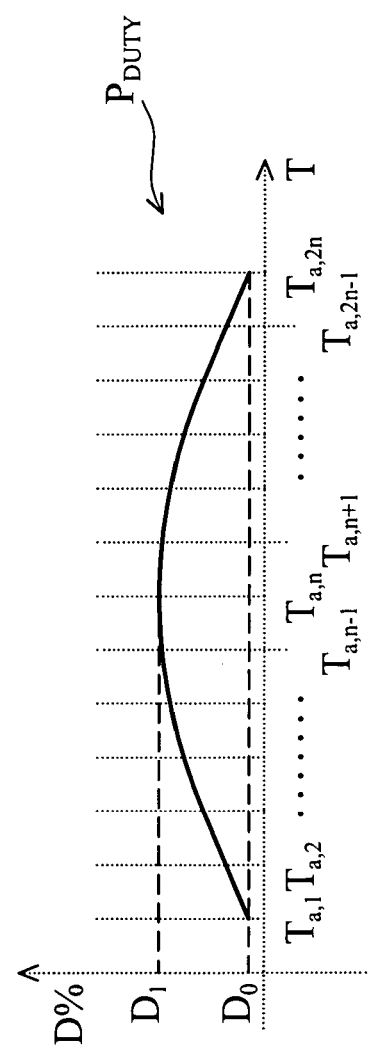
FIG. 5A
FIG. 5B

MOTOR CONTROL METHOD AND DEVICE THEREOF

BACKGROUND

The invention relates to a motor control method and device thereof, and more specifically to a motor control method and device utilizing a programmable integrated circuit (IC) to reduce noise and current pulses.

Current motor control techniques have reached maturity as a technology. Circuits exist which control motor startup and change and limit motor speed, as well as other functions.

A conventional motor control device comprises a pulse width modulation generator, a driving circuit, a Hall element and a coil switching circuit. The driving circuit receives a pulse width modulation (PWM) signal from the pulse width modulation generator and generates a driving signal to the coil switching circuit. When receiving the driving signal, the coil switching circuit outputs the driving signal to a coil of a motor accordingly and thereby switches the current directions in two neighboring phases of the coil, maintaining rotation of the motor.

The Hall element coupled between the motor and driving circuit detects the signal generated by the motor, generating a phase signal to the driving circuit. As shown in FIG. 1A, the phase signal $P_{PULSE}$ may be a square wave. Since the duty cycle D % set by the duty-cycle signal $P_{DUTY}$ of conventional driving circuits is fixed as shown in FIG. 1B, the pulse width modulation (PWM) signal $P_{PWM}$ switches between ON and OFF states as shown in FIG. 1C when the phase signal changes phase. Loud noise and current pulses typically occur when the current direction changes, particularly when used as a fan motor, limiting applicability thereof.

SUMMARY

To solve the above problems, the invention provides a motor control method, wherein when the phase signal changes phase, the duty cycle of the PWM signal is adjusted to a first duty cycle in which the input power of the motor is minimum, slowing when changing phase, reducing noise generated by the motor and current pulses.

A motor control device is provided. The motor control device drives a motor and comprises a programmable IC receiving a phase signal having the same phase as the rotation phase of a coil of the motor. The programmable IC generates a duty-cycle signal in accordance with the period of the phase signal, wherein the value of the duty-cycle signal is a first duty cycle when the phase signal changes phase and the input power of the motor is the minimum at the same time. This reduces speed when changing phase, reducing noise generated by the motor and current pulses.

DESCRIPTION OF THE DRAWINGS

The invention will be described by way of exemplary embodiments, but not limitations, illustrated in the accompanying drawings in which like references denote similar elements, and in which:

FIG. 5A is a waveform diagram of a phase signal fed back by a motor.

FIG. 5B is a waveform diagram of a duty-cycle signal according to a third embodiment of the invention.

FIG. BB is a waveform diagram of a duty-cycle signal according to a sixth embodiment of the invention.

Figure 9A:
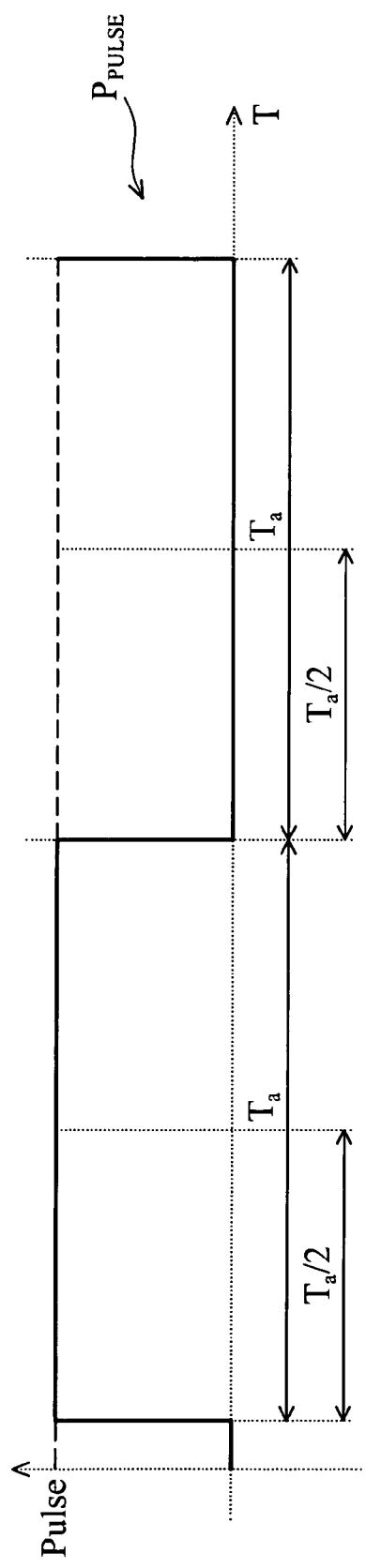

FIG. 9A is a waveform diagram of a phase signal fed back by a motor.

Figure 9B:
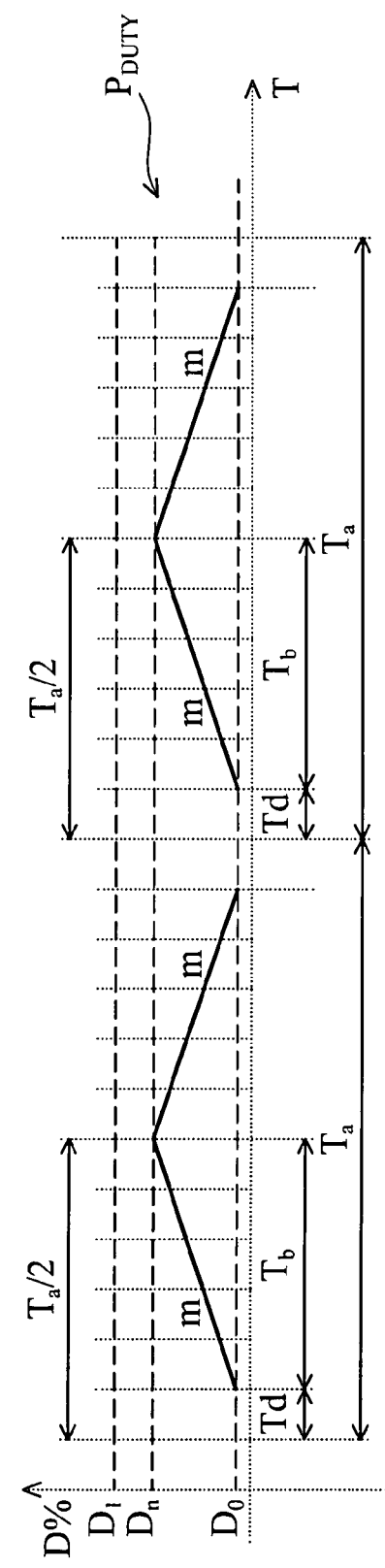

FIG. 9B is a waveform diagram of a duty-cycle signal according to a seventh embodiment of the invention.

Figure 10A:
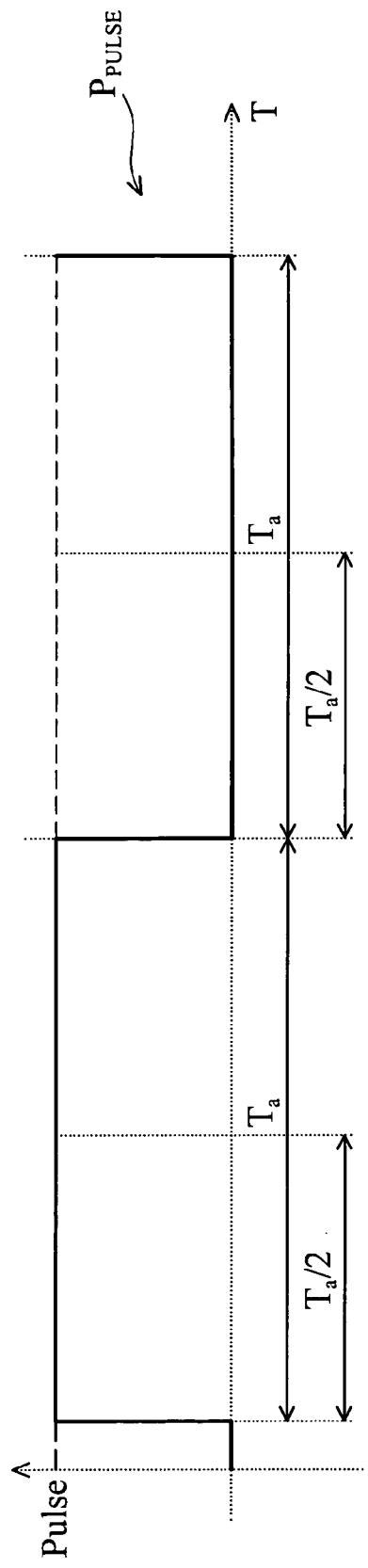

FIG. 10A is a waveform diagram of a phase signal fed back by a motor.

Figure 10B:
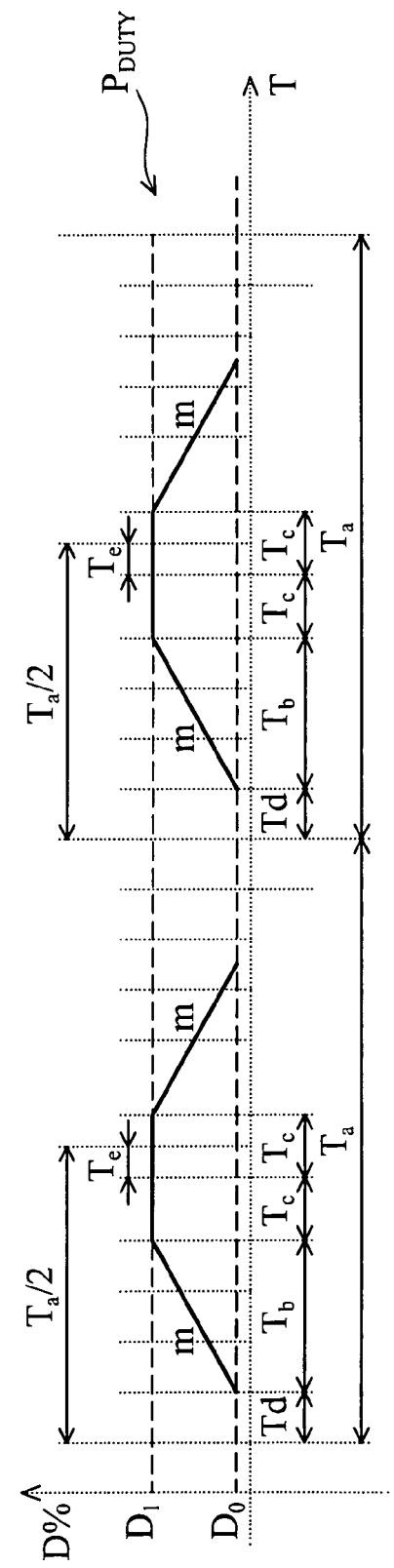

FIG. 10B is a waveform diagram of a duty-cycle signal according to a eighth embodiment of the invention.

Figure 11A:
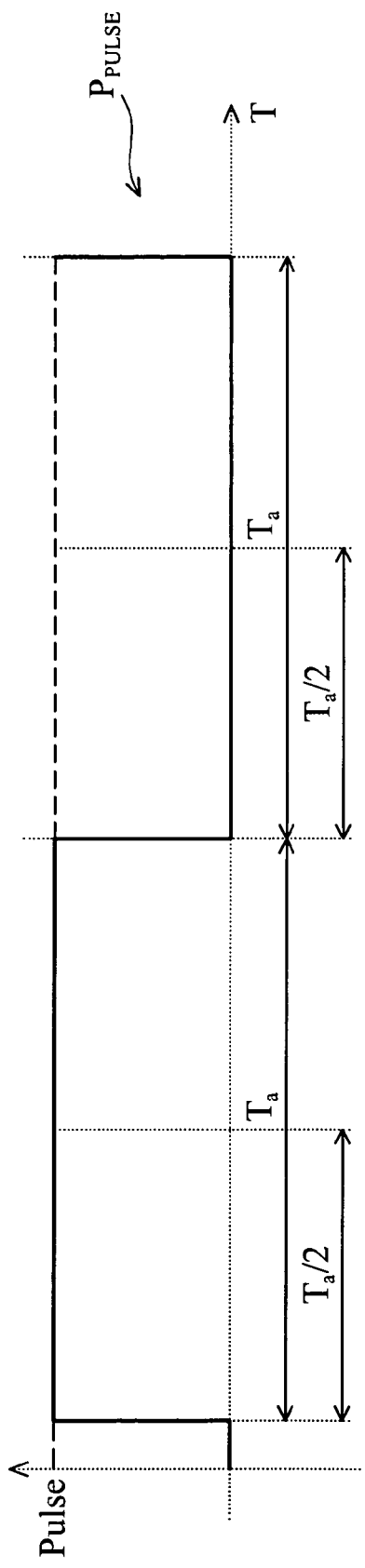

FIG. 11A is a waveform diagram of a phase signal fed back by a motor.

Figure 11B:
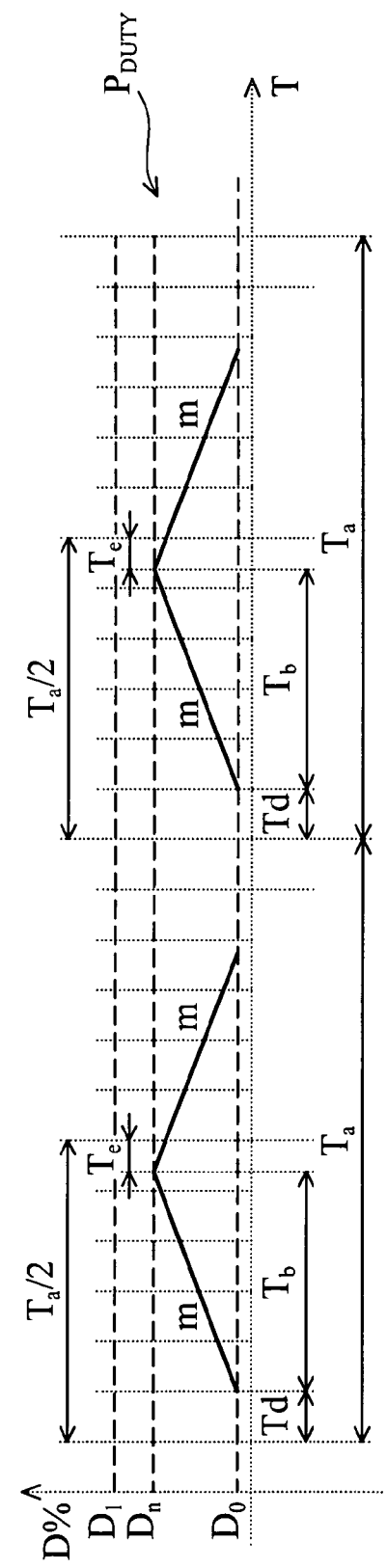

FIG. 11B is a waveform diagram of a duty-cycle signal according to a ninth embodiment of the invention.

Figure 12A:
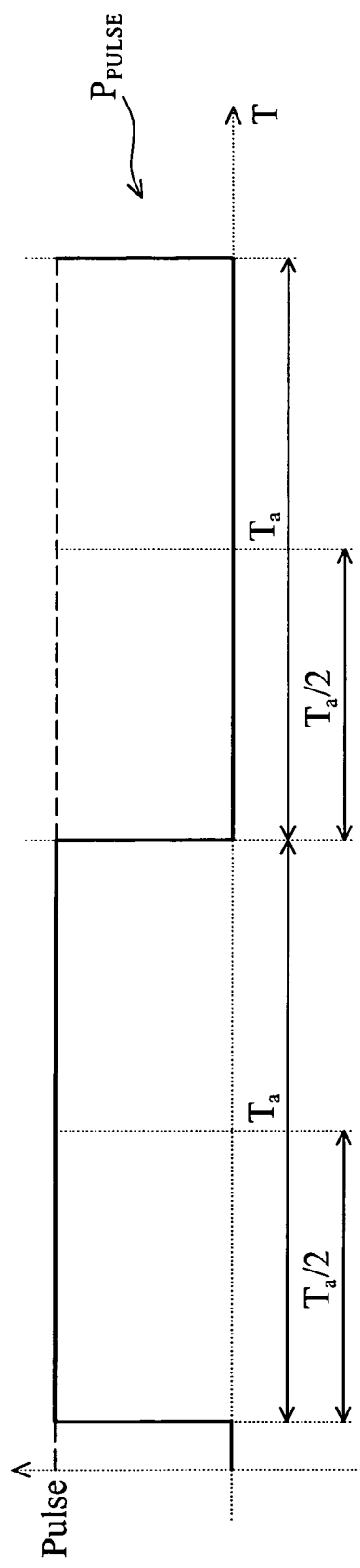

FIG. 12A is a waveform diagram of a phase signal fed back k by a motor.

Figure 12B:
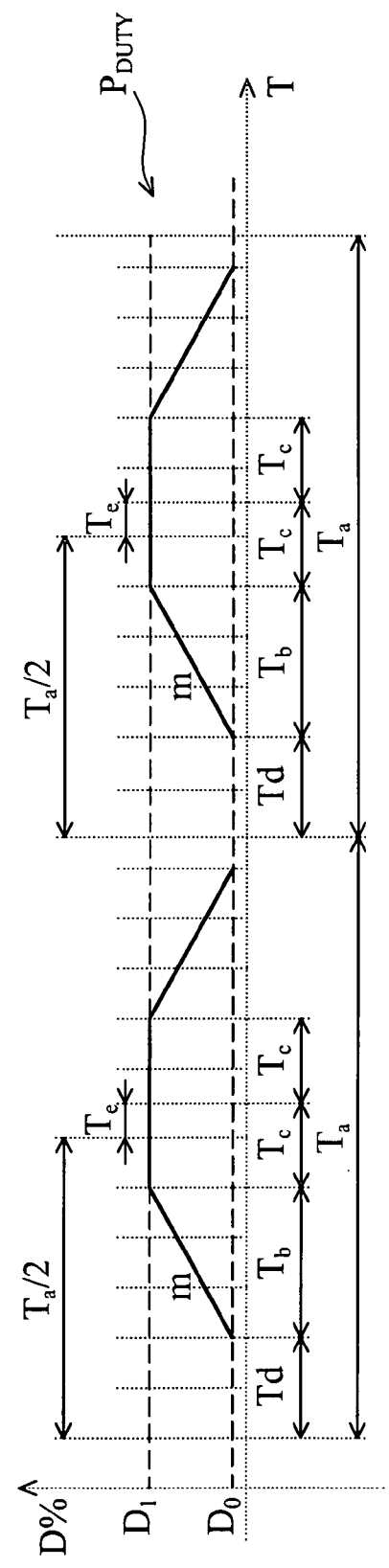

FIG. 12B is a waveform diagram of a duty-cycle signal according to a tenth embodiment of the invention.

Figure 13A:
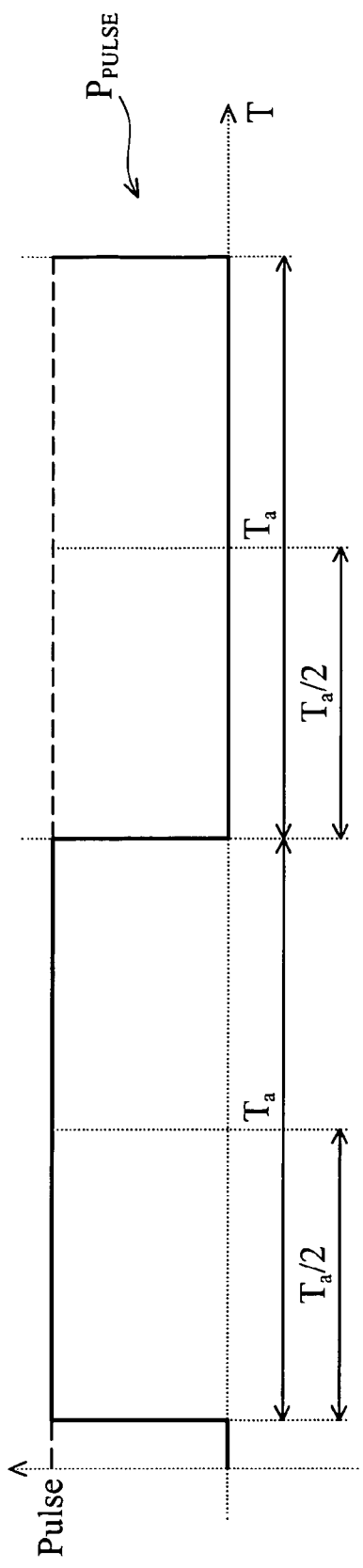

FIG. 13A is a waveform diagram of a phase signal fed back by a motor.

Figure 13B:
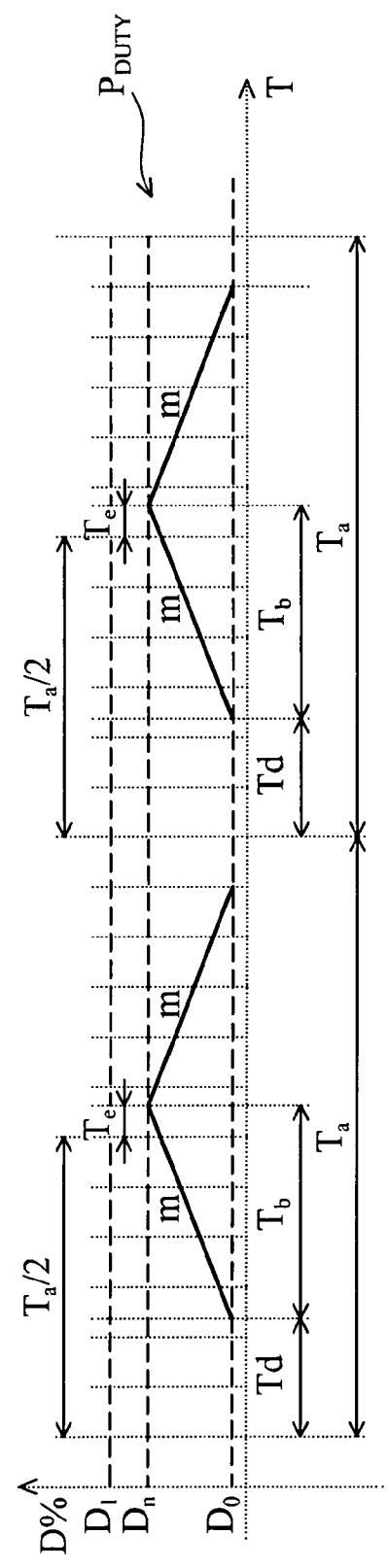

FIG. 13B is a waveform diagram of a duty-cycle signal according to a eleventh embodiment of the invention.

Figure 14A:
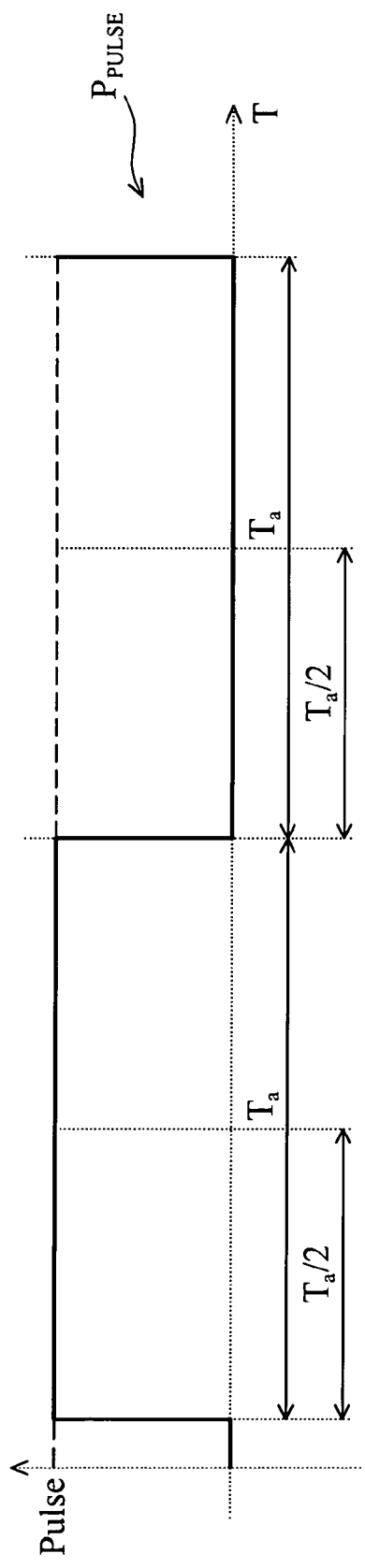

FIG. 14A is a waveform diagram of a phase signal fed back by a motor.

Figure 14B:
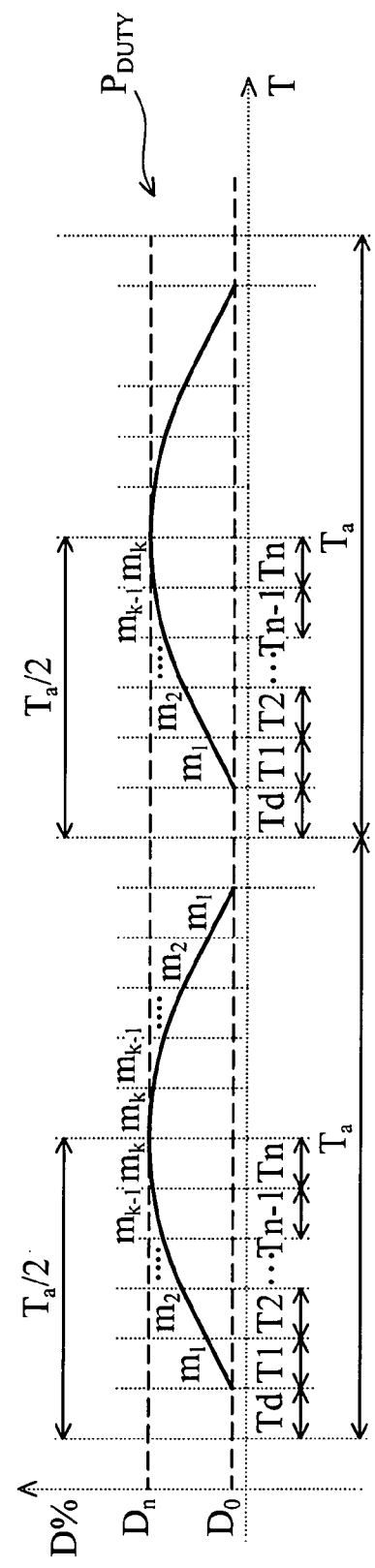

FIG. 14B is a waveform diagram of a duty-cycle signal according to a twelfth embodiment of the invention.

Figure 15A:
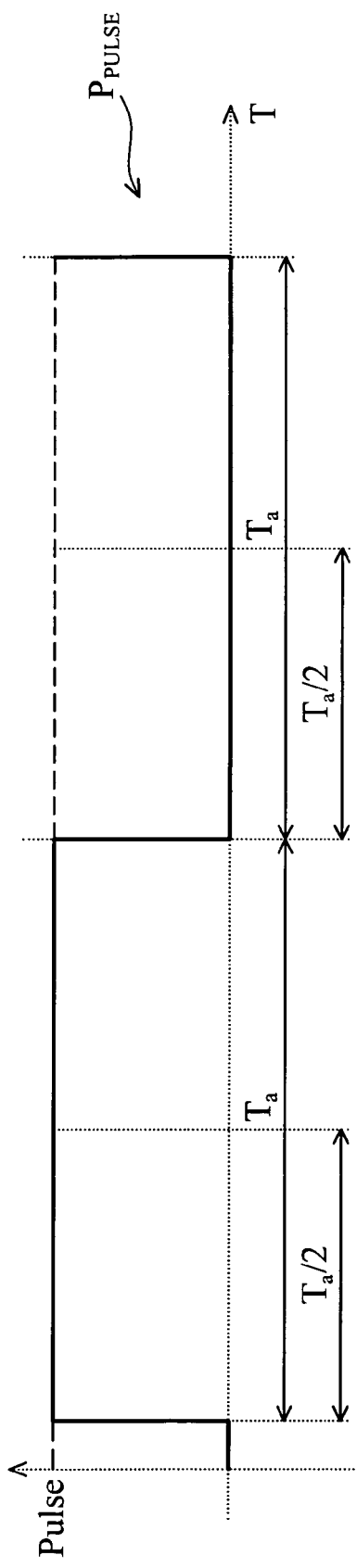

FIG. 15A is a waveform diagram of a phase signal fed back by a motor.

Figure 15B:
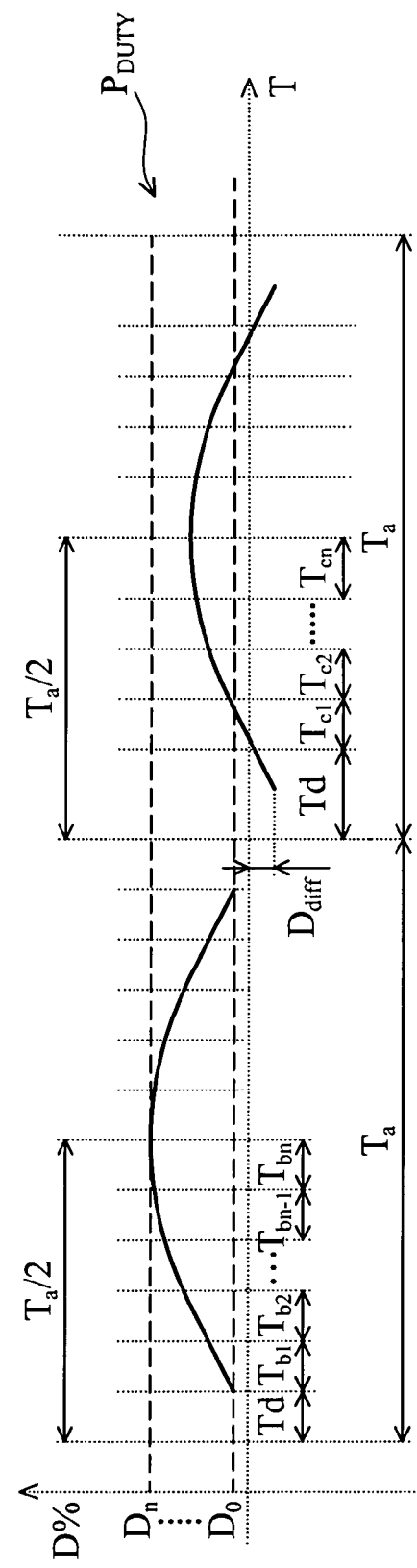

FIG. 15B is a waveform diagram of a duty-cycle signal according to a thirteenth embodiment of the invention.

Figure 16A:
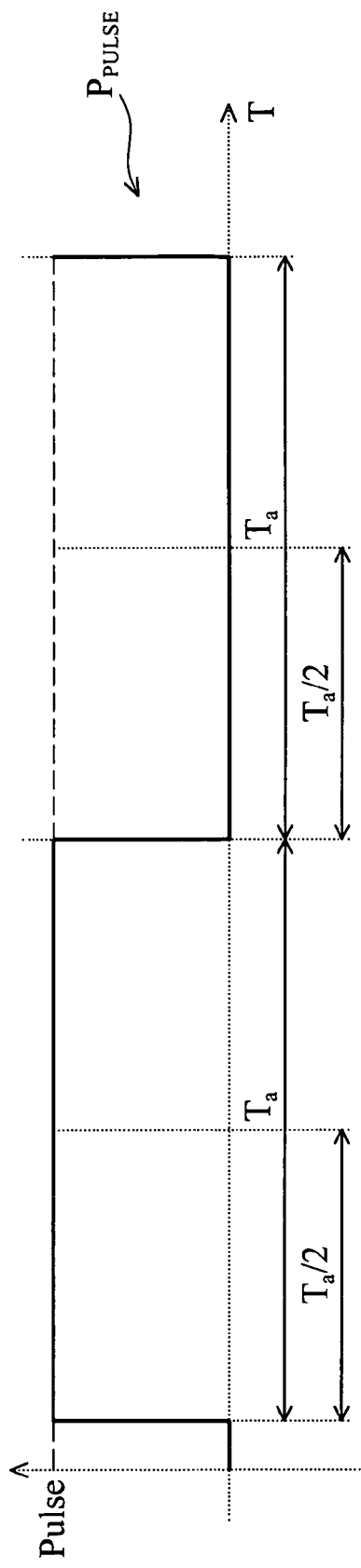

FIG. 16A is a waveform diagram of a phase signal fed back by a motor.

Figure 16B:
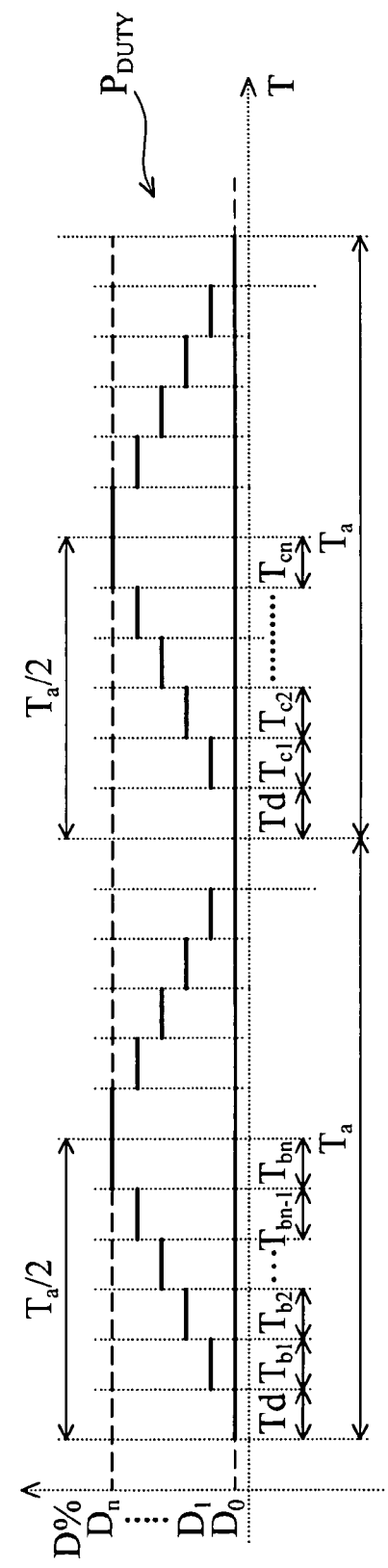

FIG. 16B is a waveform diagram of a duty-cycle signal according to a fourteenth embodiment of the invention.

Figure 17A:
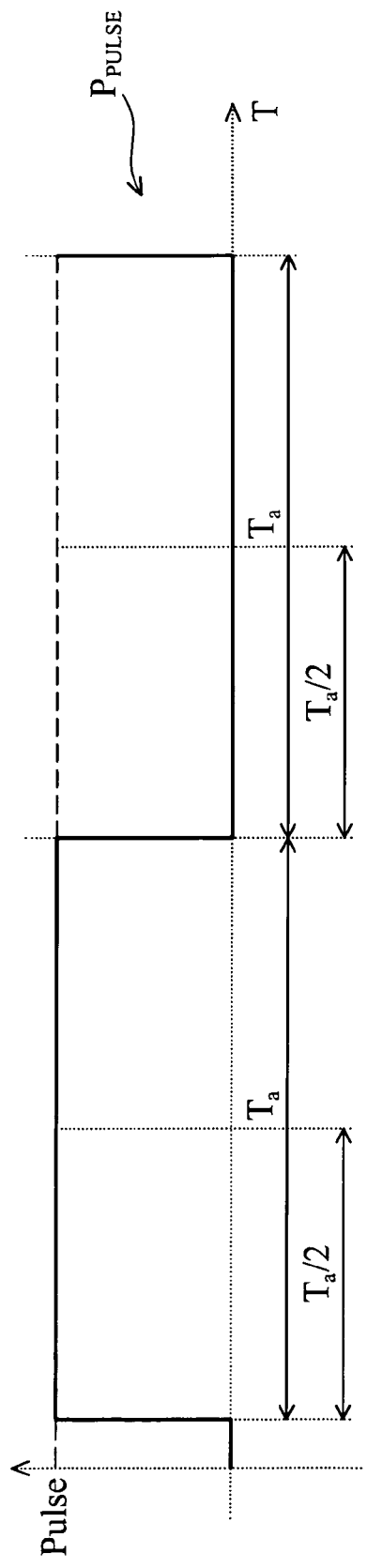

FIG. 17A is a waveform diagram of a phase signal fed back by a motor.

Figure 17B:
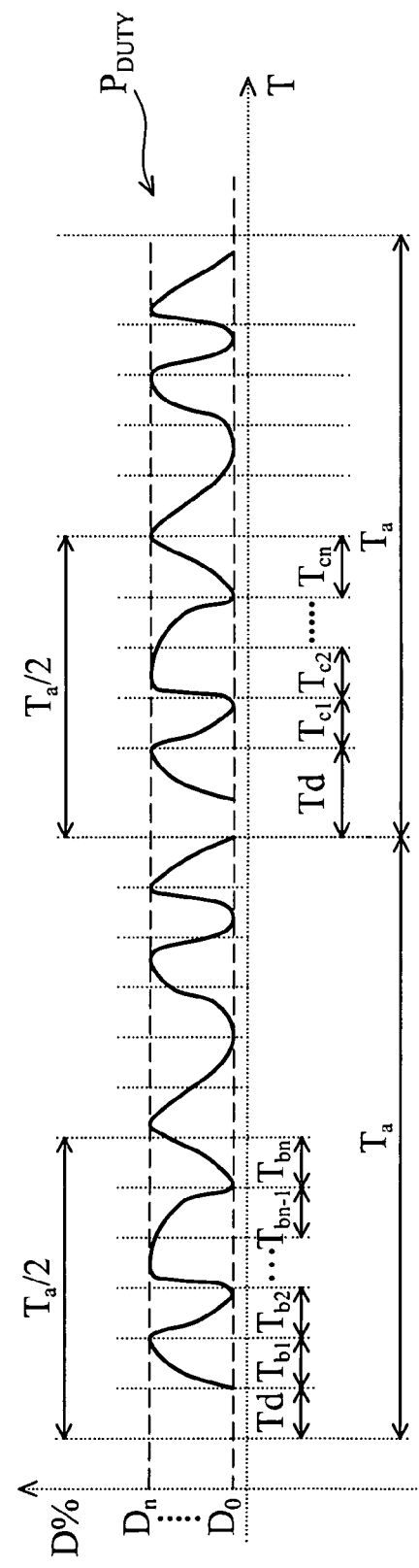

FIG. 17B is a waveform diagram of a duty-cycle signal according to a fifteenth embodiment of the invention.

Figure 18A:
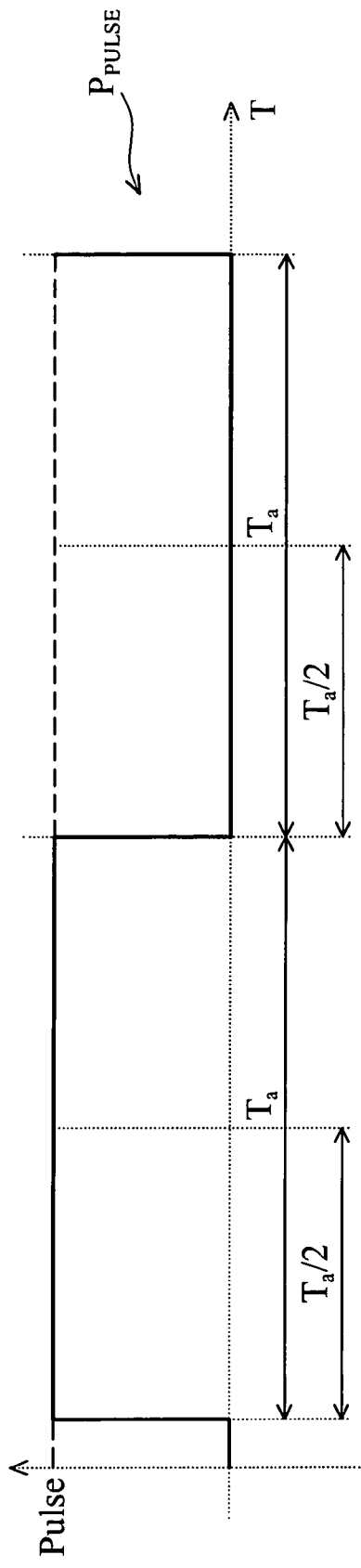

FIG. 18A is a waveform diagram of a phase signal fed back by a motor.

Figure 18B:
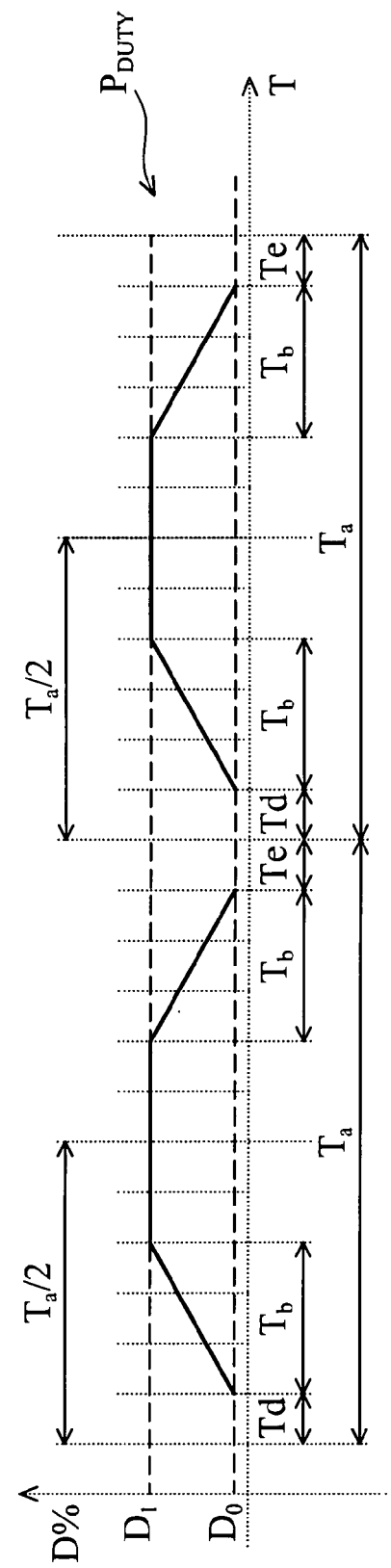

FIG. 18B is a waveform diagram of a duty-cycle signal according to a sixteenth embodiment of the invention.

Figure 19:
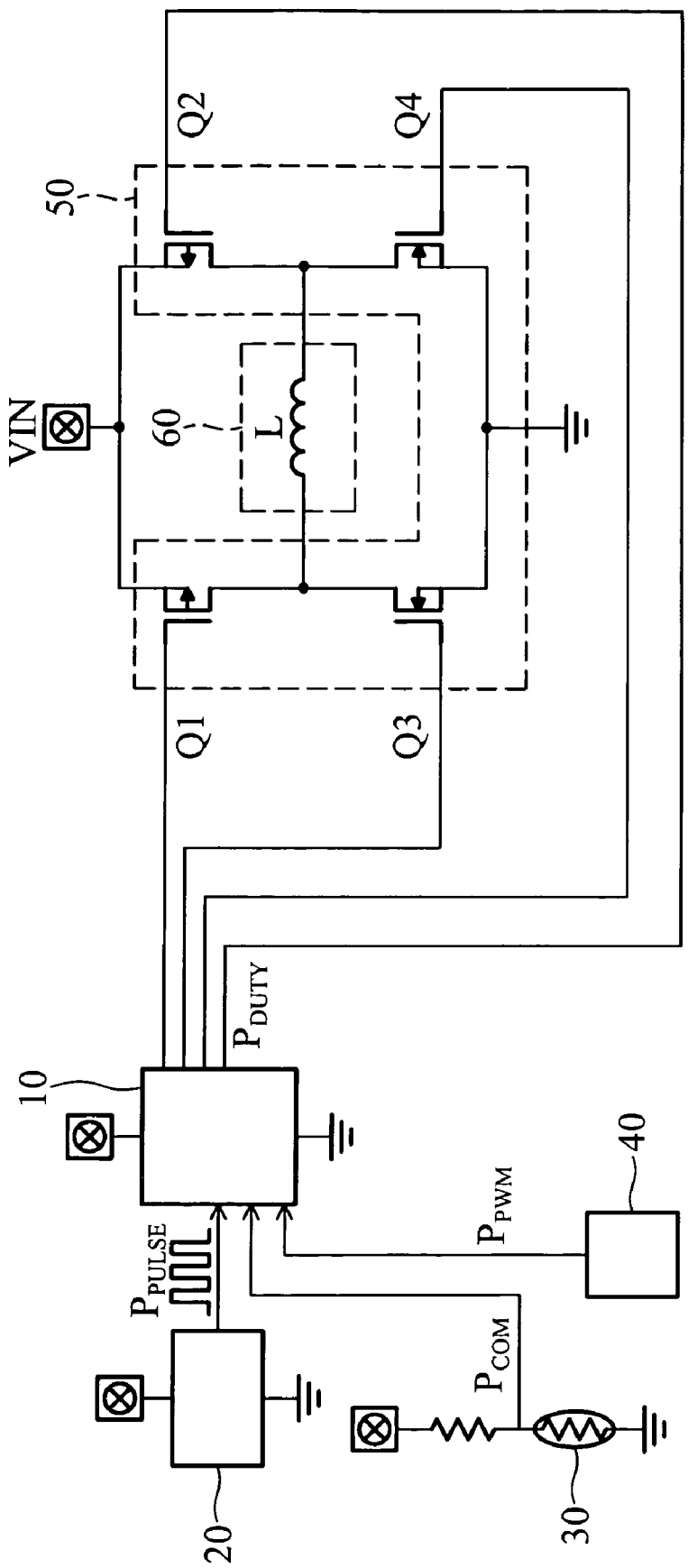

FIG. 19 shows the first hardware circuit utilizing the motor control device of the invention.

Figure 20:
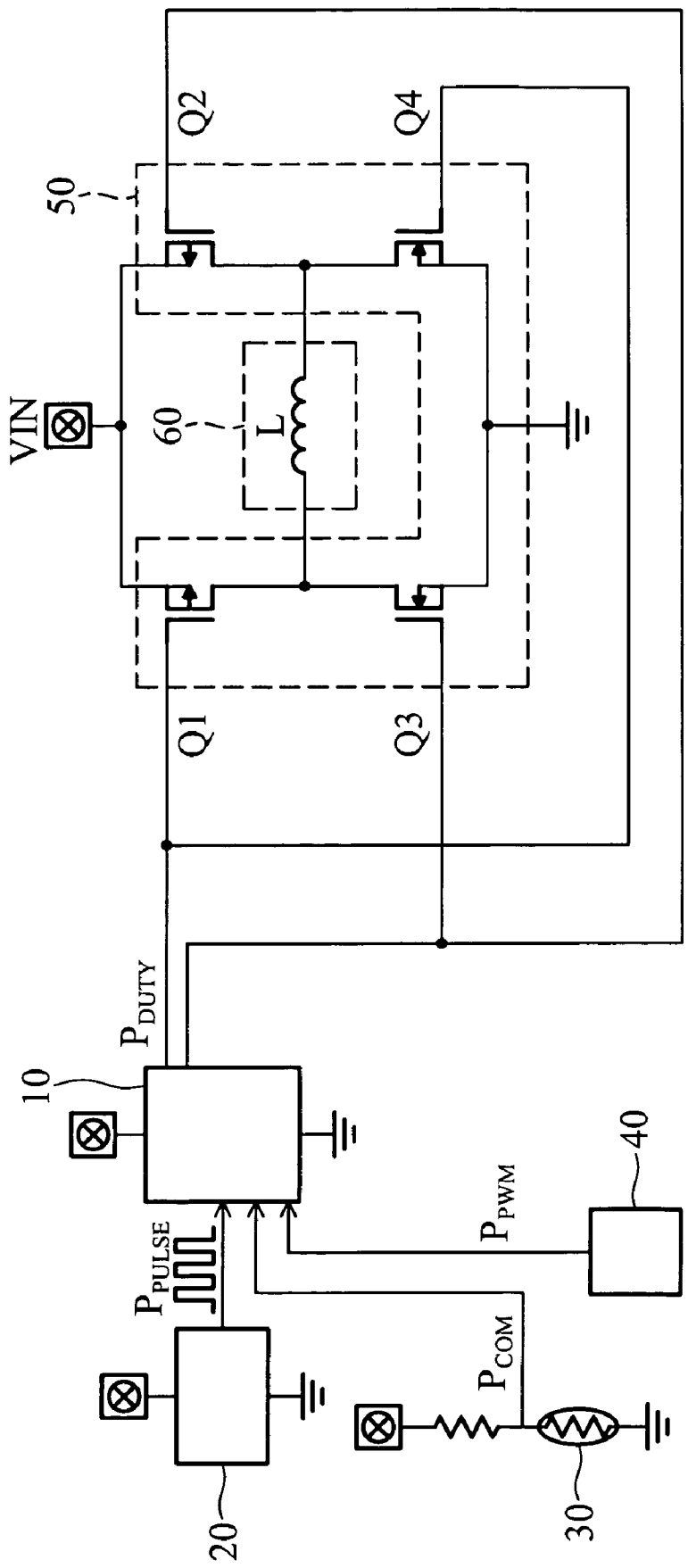

FIG. 20 shows the second hardware circuit utilizing the motor control device of the invention.

Figure 21:
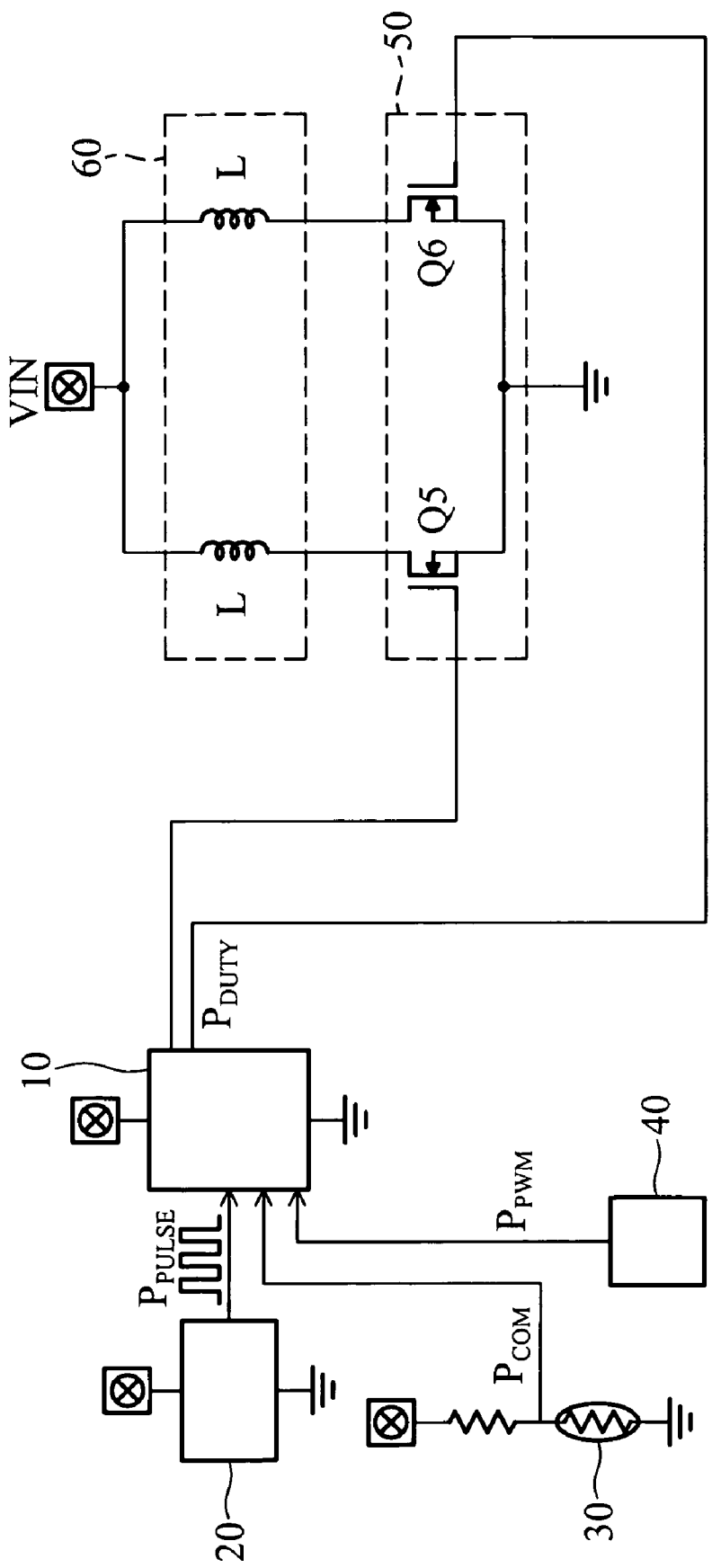

FIG. 21 shows the third hardware circuit utilizing the motor control device of the invention.

Figure 22:
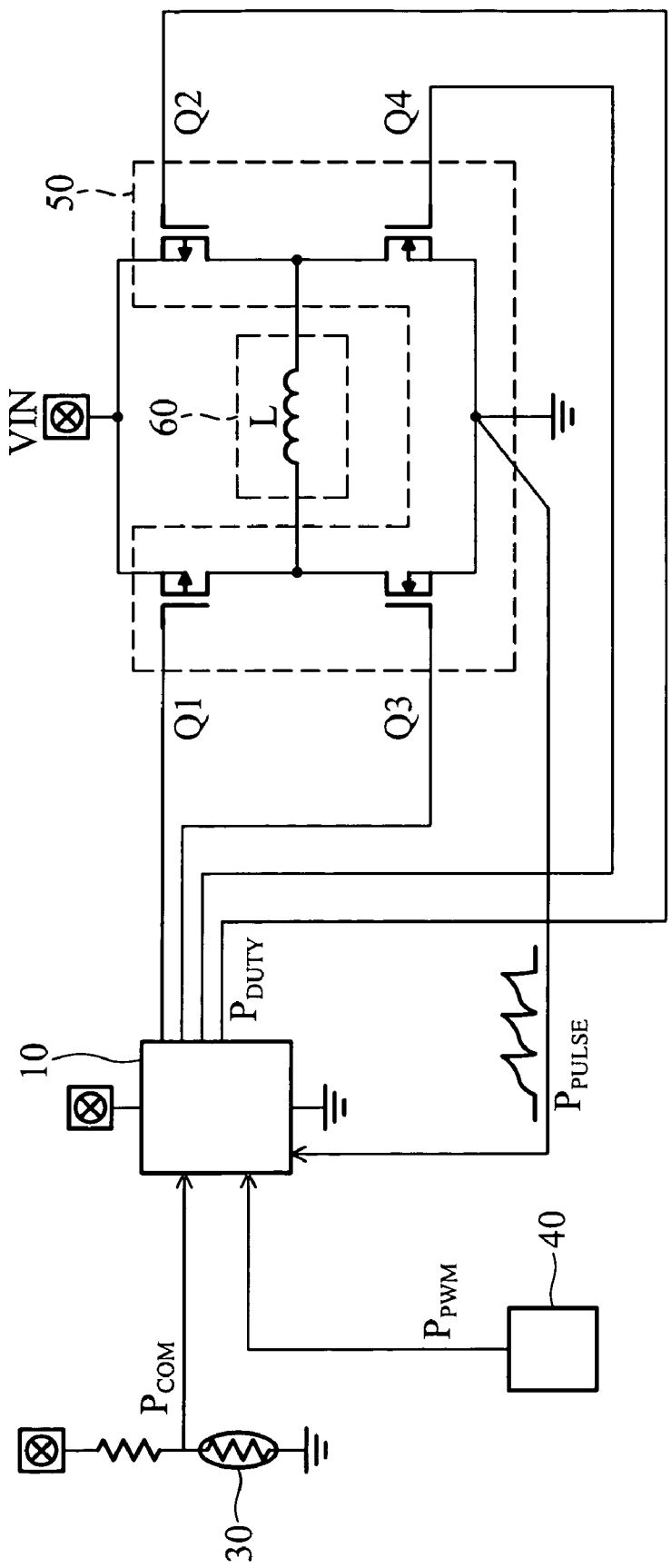

FIG. 22 shows the fourth hardware circuit utilizing the motor control device of the invention.

Figure 23:
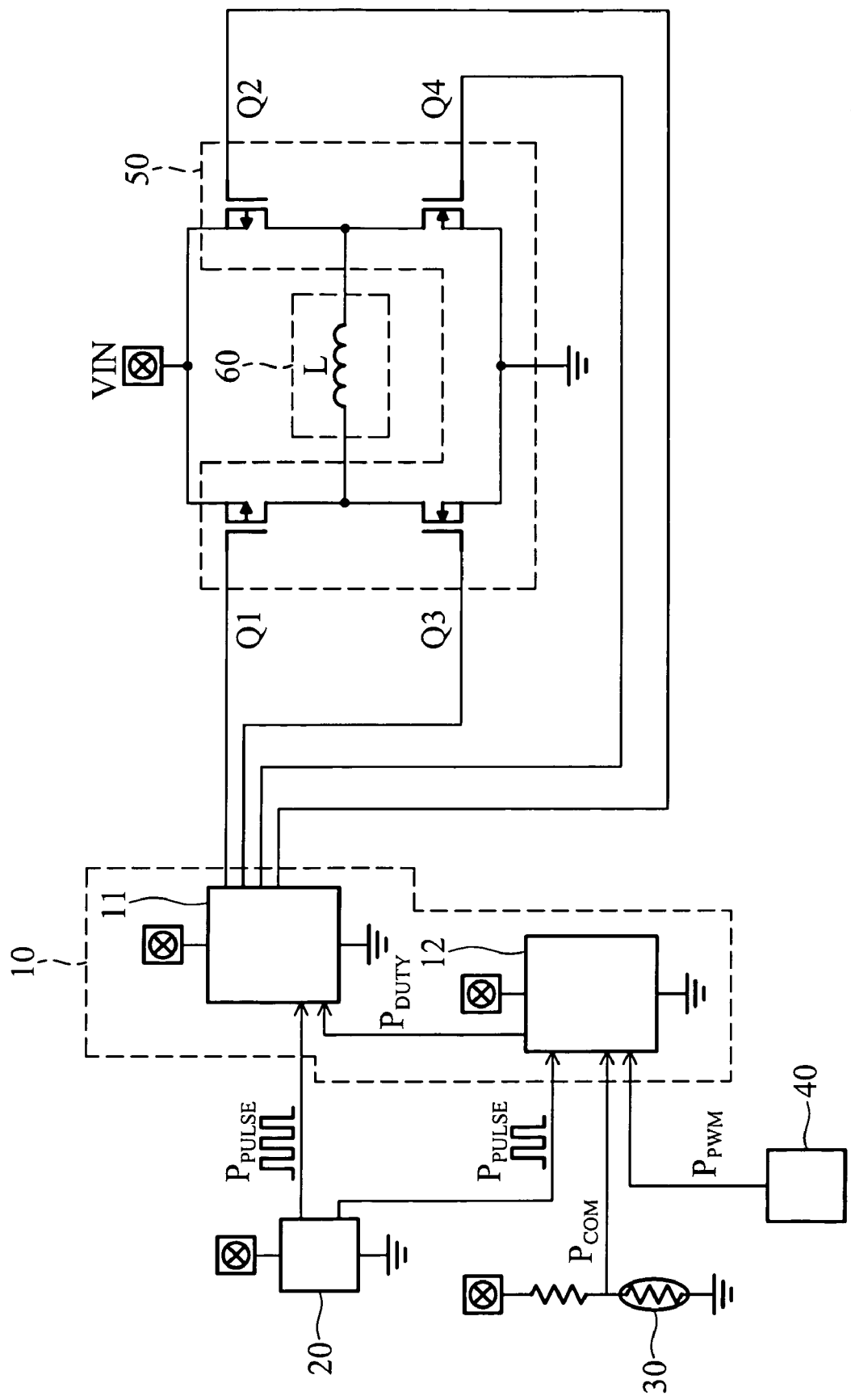

FIG. 23 shows the fifth hardware circuit utilizing the motor control device of the invention.

Figure 24:
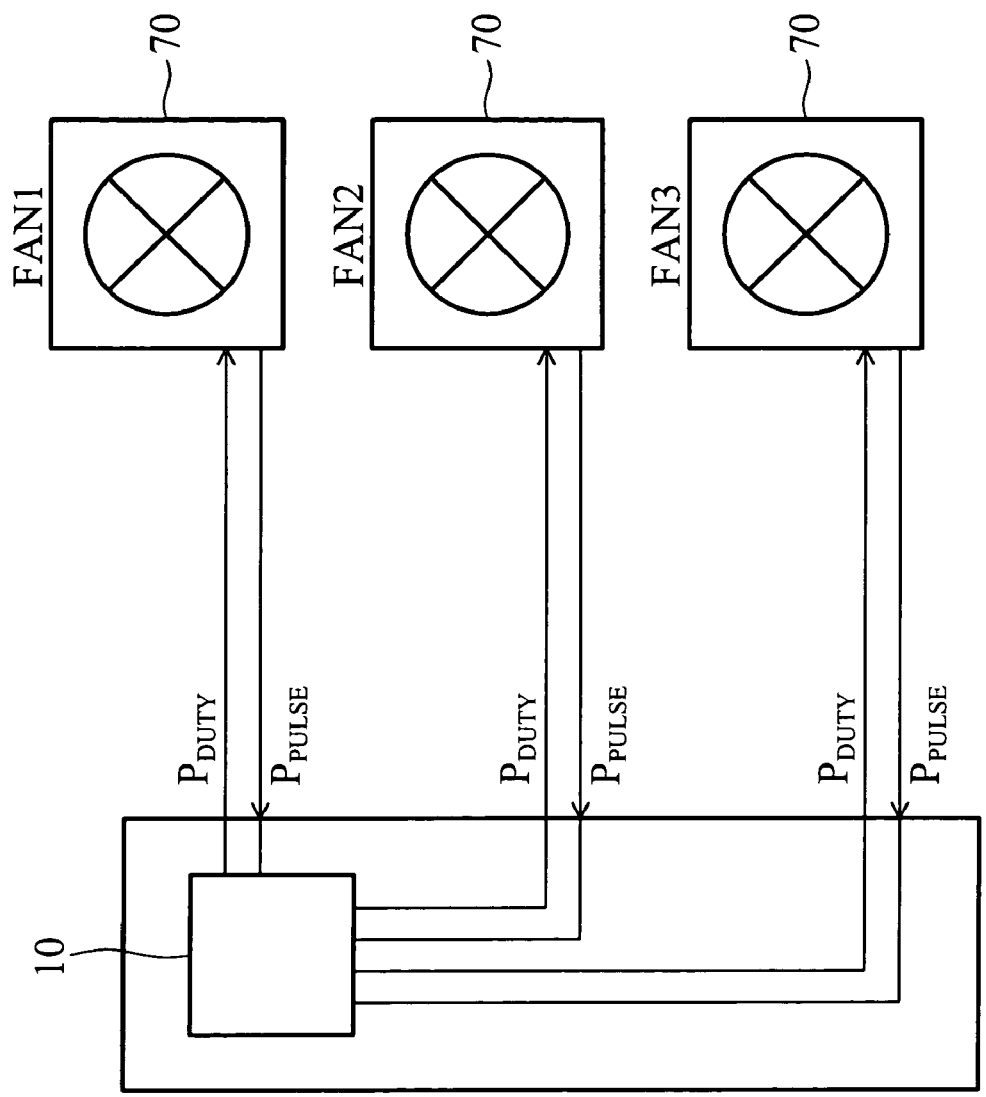

FIG. 24 shows the sixth hardware circuit utilizing the motor control device of the invention.

DETAILED DESCRIPTION

Figure 1A:
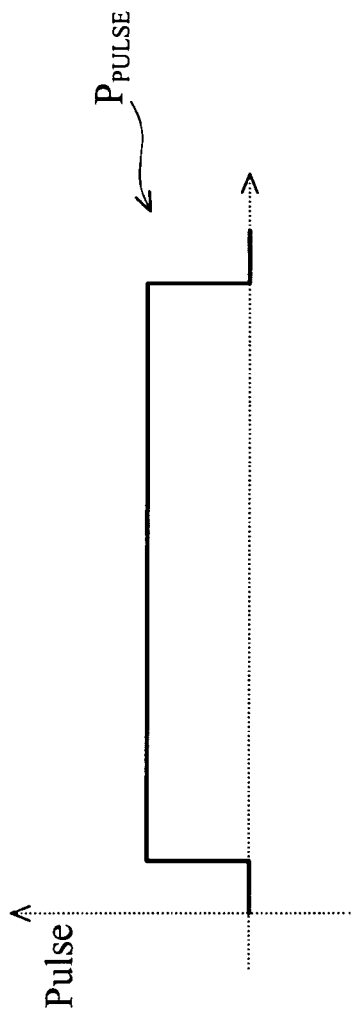
FIG. 1A is a waveform diagram of a phase signal feedback by a motor.
Figure 1B:
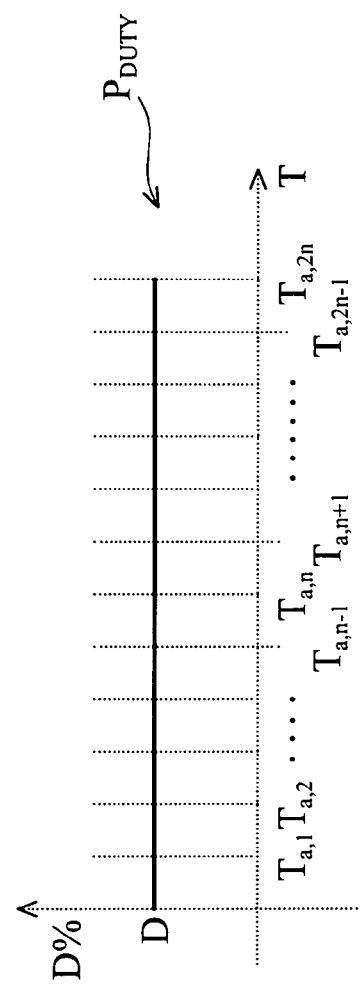
FIG. 1B is a waveform diagram of a conventional duty-cycle signal with fixed duty cycle.
Figure 1C:
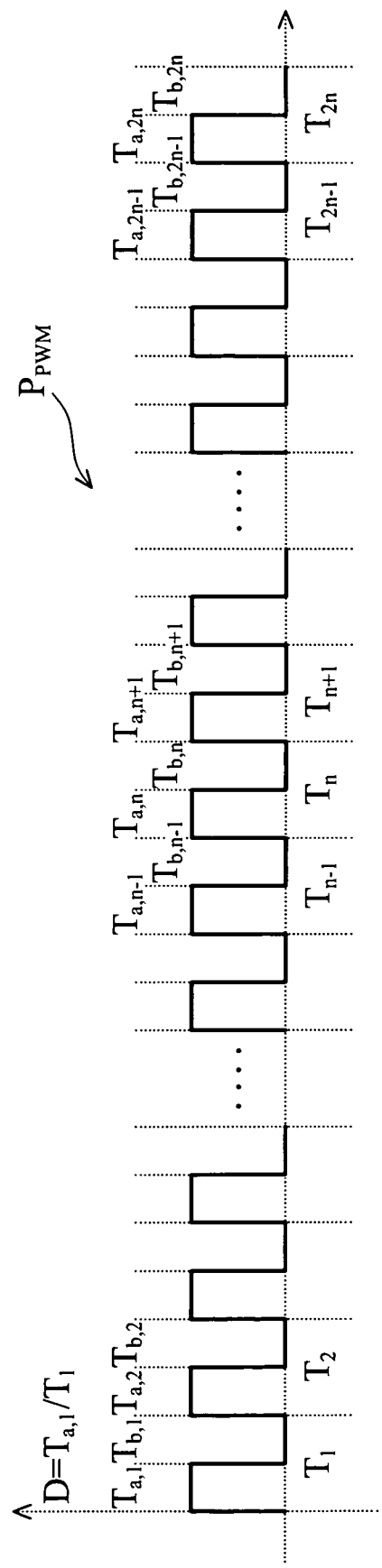
FIG. 1C is a waveform diagram of a PWM signal corresponding to the duty-cycle signal shown in FIG. 1B.
Figure 2:
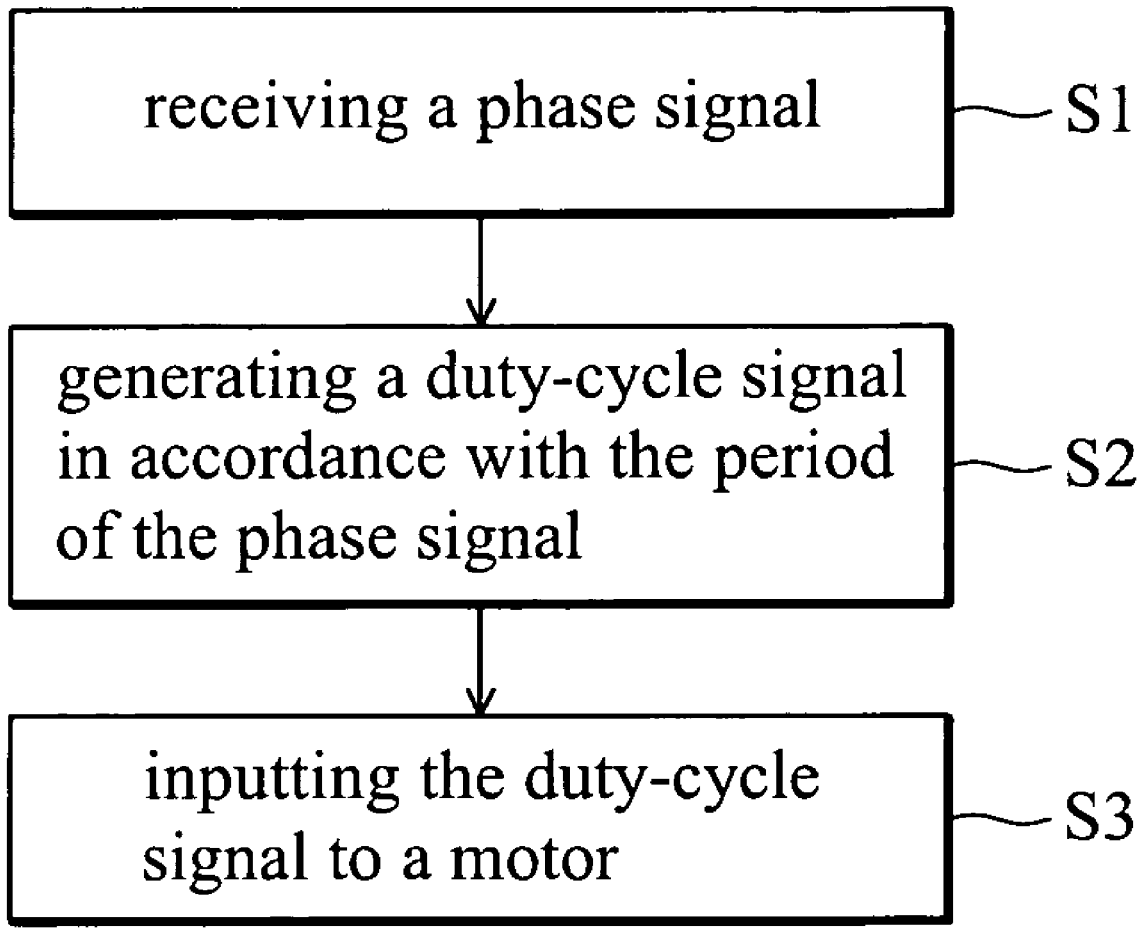
FIG. 2 is a flow diagram of a motor control method of the invention.

The invention utilizes a programmable integrated circuit (IC) to control a motor which may be a DC brushless motor or a DC brush motor. With reference to FIG. 2, the motor control method according to an embodiment of the invention comprises in step S1, receiving a phase signal generated by a Hall element coupled between the programmable IC and the motor. The phase of the phase signal is consistent with the rotation phase of a coil of the motor but may be phase lead or phase lag. Moreover, users may input the phase signal externally in accordance with the design necessity.

In step S2, the programmable IC generates a corresponding duty-cycle signal in accordance with the period of the phase signal, wherein the value of the duty-cycle signal when the phase signal changes phase is a first duty cycle, allowing the input power of the motor to be a minimum.

In step S3, the duty-cycle signal is input to a coil of the motor to switch the coil.

Embodiments of the invention are further described in the following.

Figure 3A:
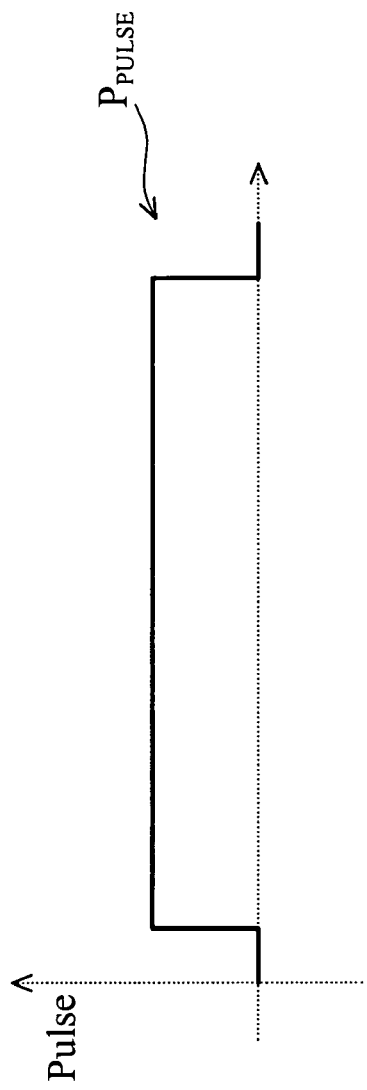
FIG. 3A is a waveform diagram of a phase signal feedback by a motor.
Figure 3B:
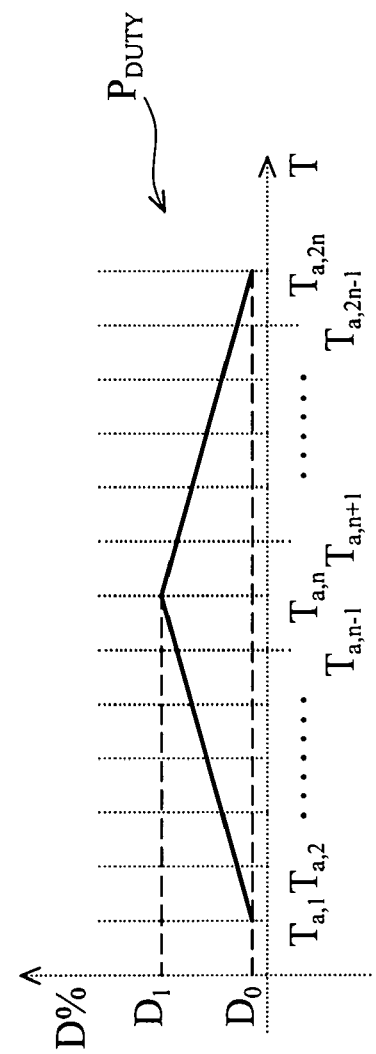
FIG. 3B is a waveform diagram of a duty-cycle signal according to a first embodiment of the invention.
Figure 3C:
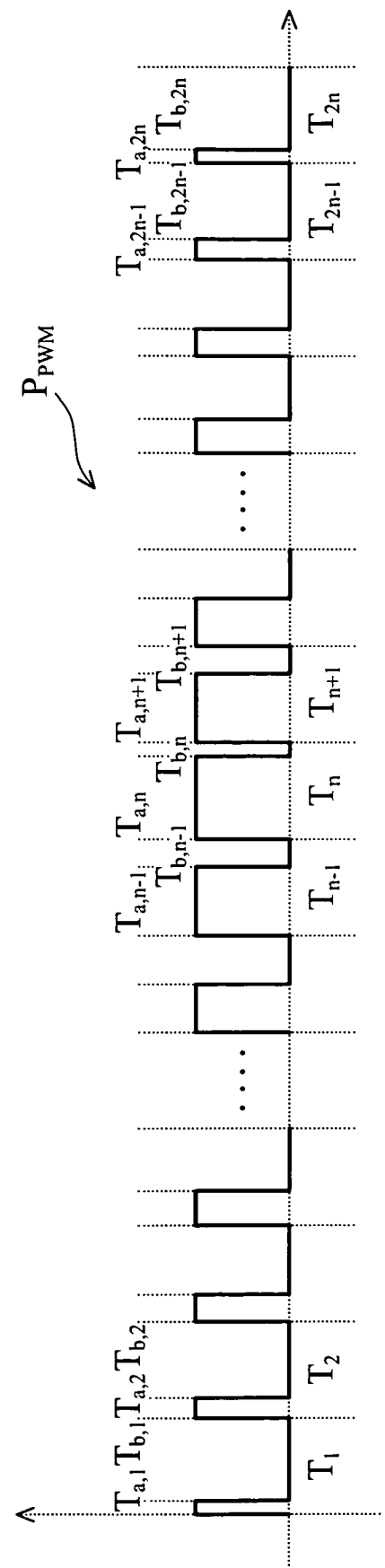
FIG. 3C is a waveform diagram of a PWM signal corresponding to the duty-cycle signal of FIG. 3B.

FIGS. 3A, 3B and 3C show a first embodiment of the invention, wherein FIG. 3A shows the half period of a phase signal $P_{PULSE}$, FIG. 3B is the waveform diagram of a duty-cycle signal $P_{DUTY}$, and FIG. 3C is the waveform diagram of a pulse width modulation (PWM) signal $P_{PWM}$ corresponding to the duty-cycle signal shown in FIG. 3B. The duty-cycle signal $P_{DUTY}$ in this embodiment is a triangle wave, wherein the duty cycle it represents increases from a first duty cycle $D_0$ which is any value between 0%~100%, to a second duty cycle $D_1$ which is any value between $D_0$~100% and set according to the maximum input power of the motor, and then decreases from the second duty cycle $D_1$ to the first duty cycle $D_0$. It is noted that the slope value of the rising segment of the duty-signal $P_{DUTY}$ is the same as that of the falling segment of the duty-signal $P_{DUTY}$.

As shown in FIG. 3C, the PWM signal $P_{PWM}$ corresponding to the half period of the phase signal $P_{PULSE}$ is divided into time intervals $T_1, T_2 \ldots, T_{n-1}, T_n, T_{n+1}, \ldots, T_{2n}$ and $T_{2n}$, and the intervals of each time interval for ON and OFF sates are $T_a$ and $T_b$ respectively. The relation between $T_a$ and $T_b$ is represented by the following formulae:

$$T_{a,1} < T_{a,2} < \ldots < T_{a,n-1} < T_{a,n} > T_{a,n+1} > \ldots > T_{a,2n-1} > T_{a,2n} \quad 1.$$

$$T_{b,1} > T_{b,2} > \ldots > T_{b,n-1} > T_{b,n} < T_{b,n+1} < \ldots < T_{b,2n-1} < T_{b,2n} \quad 2.$$

Wherein turning on time near the timing at which the phase signal changes phase is shorter. Moreover, when the phase signal $P_{PULSE}$ changes phase, the value of the duty-cycle signal $P_{DUTY}$ is the first duty cycle $D_0$; that is the power input to the coil is at a minimum or even zero when the phase signal $P_{PULSE}$ changes phase, allowing the motor to rotate at a low speed or rotate because of inertia when changing direction. Consequently, noise and current pulses generated due to counter-electromotive force and motor torque are reduced.

Figure 4A:
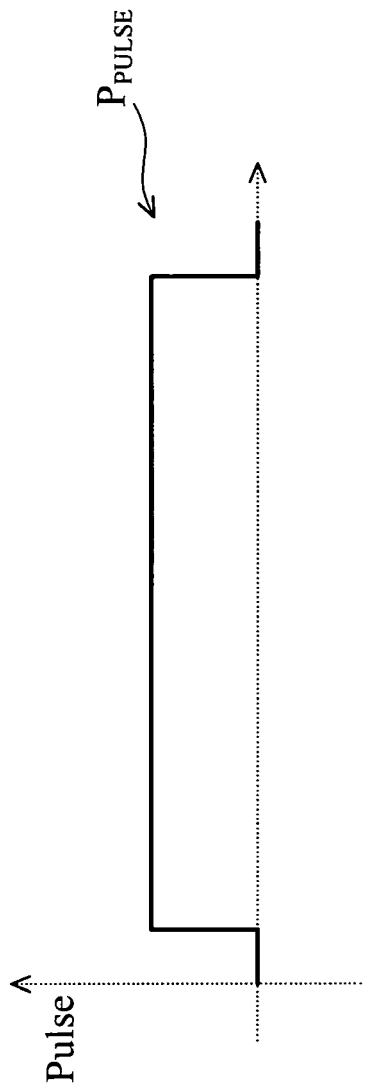
FIG. 4A is a waveform diagram of a phase signal feedback by a motor.
Figure 4B:
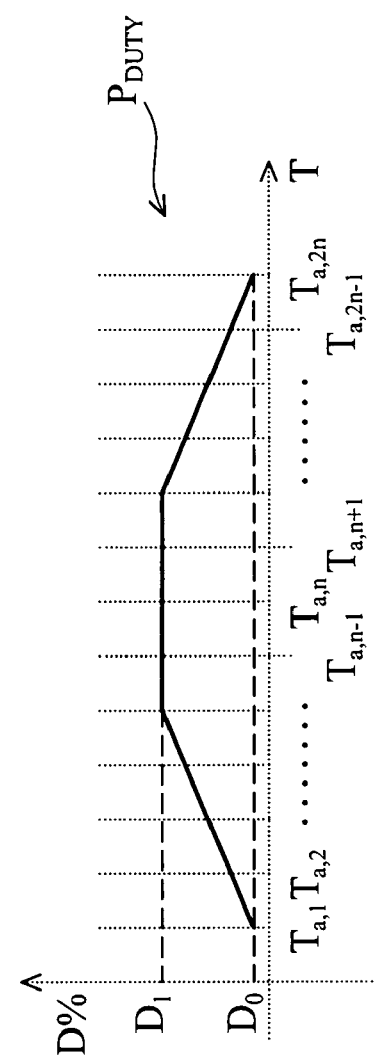
FIG. 4B is a waveform diagram of a duty-cycle signal according to a second embodiment of the invention.
Figure 4C:
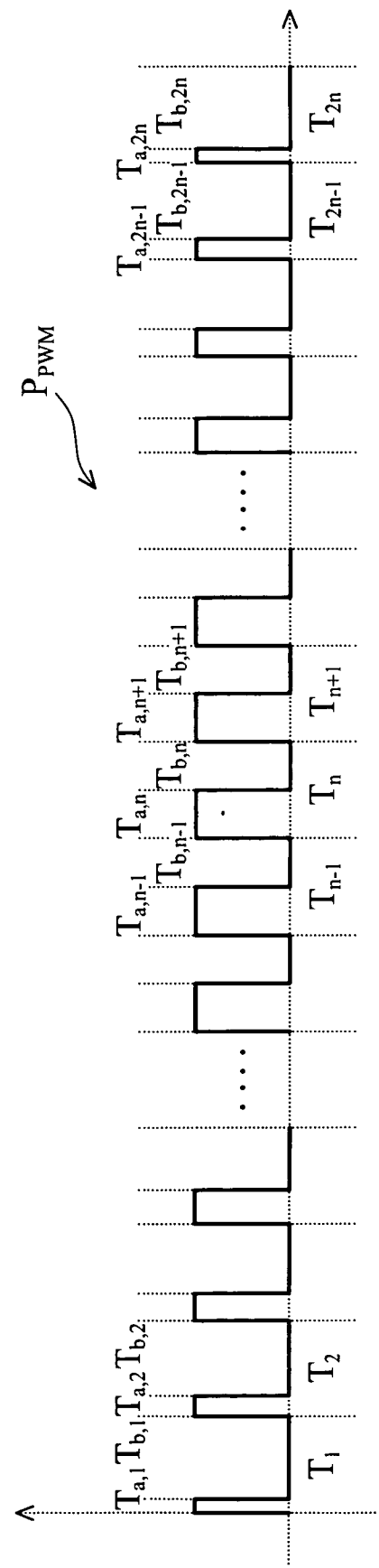
FIG. 4C is a waveform diagram of a PWM signal corresponding to the duty-cycle signal of FIG. 4B.

FIGS. 4A, 4B and 4C show a second embodiment of the invention, wherein the duty-cycle signal $P_{DUTY}$ is a trapezoid wave and the duty cycle it represents increases from the first duty cycle $D_0$ (any value between 0%~100%) to the second duty cycle $D_1$ (a value between $D_0$ and 100%); after holding at the second duty cycle $D_1$ for an interval, it decreases from the second duty cycle $D_1$ to the first duty cycle $D_0$. It is noted that the slope value of the rising segment of the duty-signal $P_{DUTY}$ is the same as that of the falling segment of the duty-signal $P_{DUTY}$.

As shown in FIG. 4C, the PWM signal $P_{PWM}$ corresponding to the half period of the phase signal $P_{PULSE}$ is divided into time intervals $T_1, T_2 \ldots, T_{n-1}, T_n, T_{n+1}, \ldots, T_{2n}$ and $T_{2n}$, with intervals of each for ON and OFF sates are $T_a$ and $T_b$ respectively. The relation between $T_a$ and $T_b$ is represented by the following formulae:

$$T_{a,1} < T_{a,2} < \ldots < T_{a,n-1} < T_{a,n} > T_{a,n+1} > \ldots > T_{a,2n-1} > T_{a,2n} \quad 1.$$

$$T_{b,1} > T_{b,2} > \ldots > T_{b,n-1} > T_{b,n} < T_{b,n+1} < \ldots < T_{b,2n-1} < T_{b,2n} \quad 2.$$

Unlike the first embodiment, the slope value of the duty-cycle signal $P_{DUTY}$ is greater and its duty cycle holds at the second duty cycle $D_1$ for an interval. Such difference can be utilized for different motor rotation control. Still, here, the duty cycle represented by the duty-cycle signal $P_{DUTY}$ is the first duty cycle $D_0$ when the phase signal changes phase, reducing noise and current pulses generated due to counter-electromotive force and motor torque.

Figure 5C:
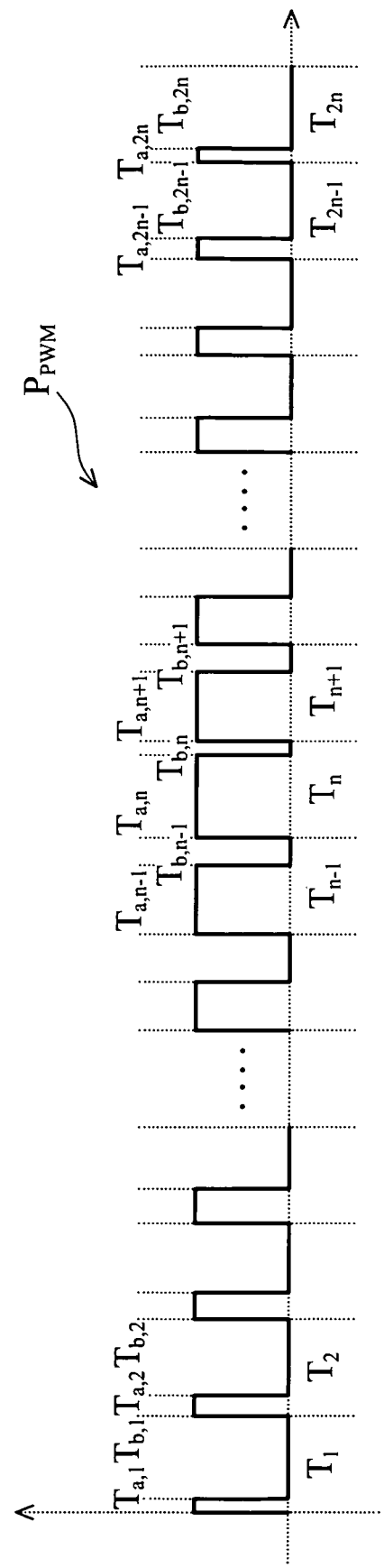
FIG. 5C is a waveform diagram of a PWM signal corresponding to the duty-cycle signal of FIG. 5B.

FIGS. 5A, 5B and 5C show a third embodiment of the invention, wherein the duty-cycle signal $P_{DUTY}$ is a sinusoidal wave, and the duty cycle it represents increases from the first duty cycle $D_0$ (any value between 0%~100%) to the second duty cycle $D_1$ (a value between $D_0$ and 100%) and then decreases from the second duty cycle $D_1$ to the first duty cycle $D_0$. It is noted that the radian of the increasing curve is the same as that of the decreasing curve.

As shown in FIG. 5C, the PWM signal $P_{PWM}$ corresponding to the half period of the phase signal $P_{PULSE}$ is divided into $T_1, T_2 \ldots, T_{n-1}, T_n, T_{n+1}, \ldots, T_{2n}$ and $T_{2n}$, with intervals of each for ON and OFF sates are $T_a$ and $T_b$ respectively. The relation between $T_a$ and $T_b$ is represented by the following formulae:

$$T_{a,1} < T_{a,2} < \ldots < T_{a,n-1} < T_{a,n} > T_{a,n+1} > \ldots > T_{a,2n-1} > T_{a,2n} \quad 1.$$

$$T_{b,1} > T_{b,2} > \ldots > T_{b,n-1} > T_{b,n} < T_{b,n+1} < \ldots < T_{b,2n-1} < T_{b,2n} \quad 1.$$

Unlike the previous embodiments, the duty cycle signal $P_{DUTY}$ is non-linear. Such difference can also be utilized in different motor rotation controls. Still, here, the duty cycle represented by the duty-cycle signal $P_{DUTY}$ is the first duty cycle $D_0$ when the phase signal changes phase, reducing noise and current pulses generated due to counter-electromotive force and motor torque.

The first duty cycle $D_0$ of the first to three embodiments which allows input power of the motor to be a minimum is a value between 0% and the second duty cycle $D_1$. The speed of the motor increases when the duty-cycle signal approaches 100% from 0%. Conversely, the speed of the motor may decrease when the duty-cycle signal approaches 100% from 0%. Such modifications are familiar for those skilled in the art, and therefore are not further described.

Figure 6A:
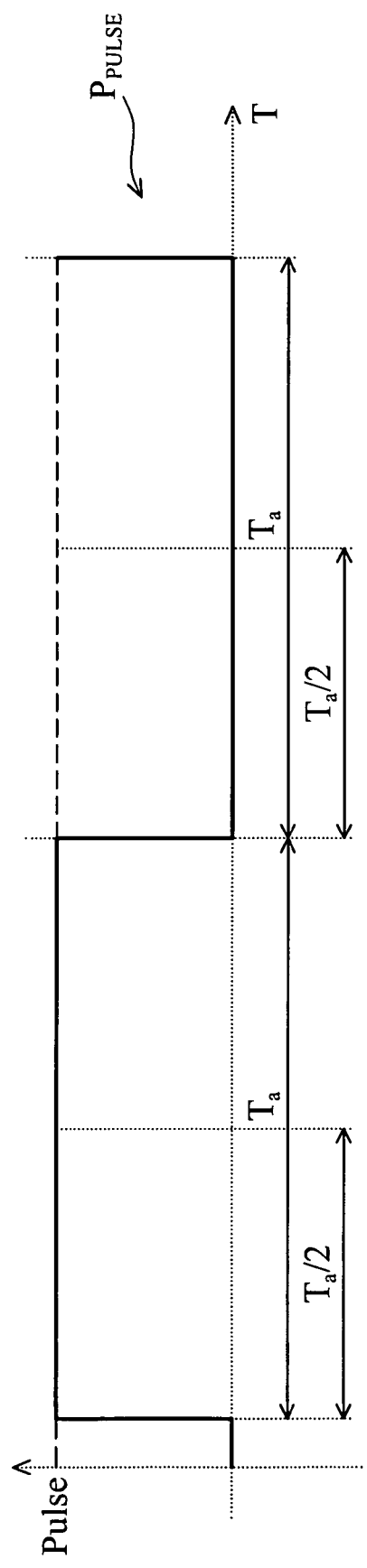
FIG. 6A is a waveform diagram of a phase signal fed back by a motor.
Figure 6B:
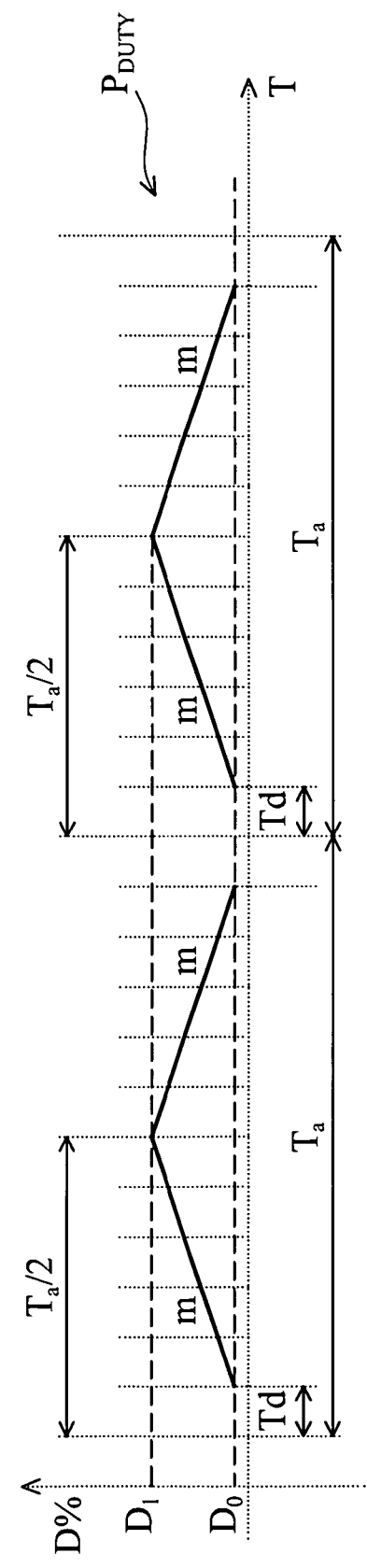
FIG. 6B is a waveform diagram of a duty-cycle signal according to a fourth embodiment of the invention.

FIGS. 6A and 6B a fourth embodiment of the invention, wherein the duty-cycle signal $P_{DUTY}$ is a triangle wave. Unlike the first embodiment, after holding at the first duty cycle $D_0$ for an interval $T_d$, the duty cycle represented by the duty-cycle signal $P_{DUTY}$ increases to the second duty cycle $D_1$, and then decreases from the second duty cycle $D_1$ to the first duty cycle $D_0$ and holds for the interval $T_d$.

It is noted that the slope value of the duty cycle signal $P_{DUTY}$ from $D_0$ to $D_1$ and $D_1$ to $D_0$ is the same and is represented by the following formula:

$$m=(D_1-D_0)/(T_a/2-T_d);$$

wherein $T_a$ is the half period of the phase signal $P_{PULSE}$, $T_d$ is a constant between 0 to $T_a/2$, and the first duty cycle $D_0$ and second duty cycle $D_1$ are fixed values between 0%~100% and $D_1>D_0$.

In this embodiment, when the phase signal $P_{PULSE}$ changes phase, the duty cycle signal $P_{DUTY}$ is delayed for the interval of two $T_d$, ensuring noise and current pulses are not generated due to counter-electromotive force and motor torque, thus obtaining better performance.

Figure 7A:
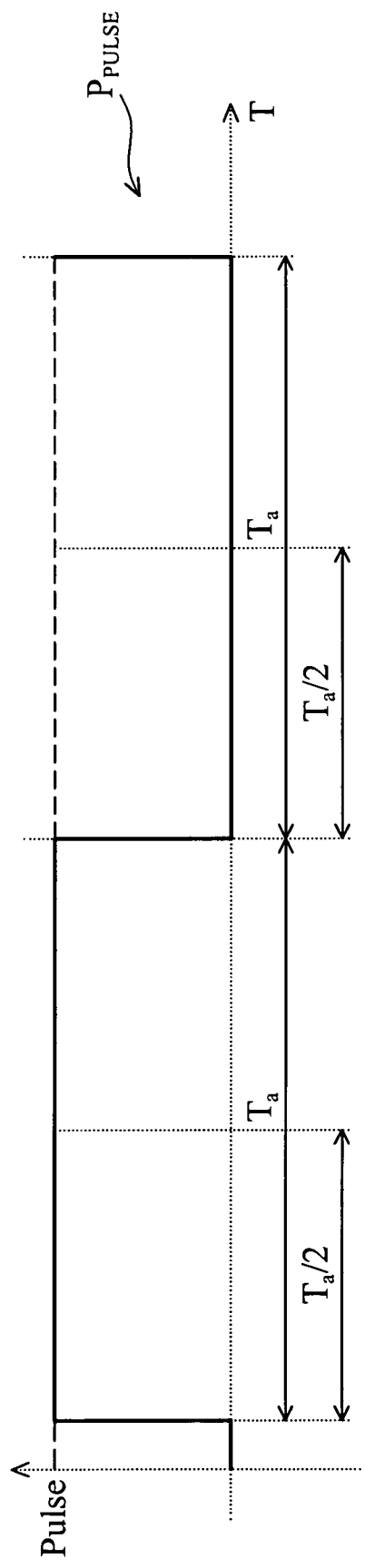
FIG. 7A is a waveform diagram of a phase signal fed back by a motor.
Figure 7B:
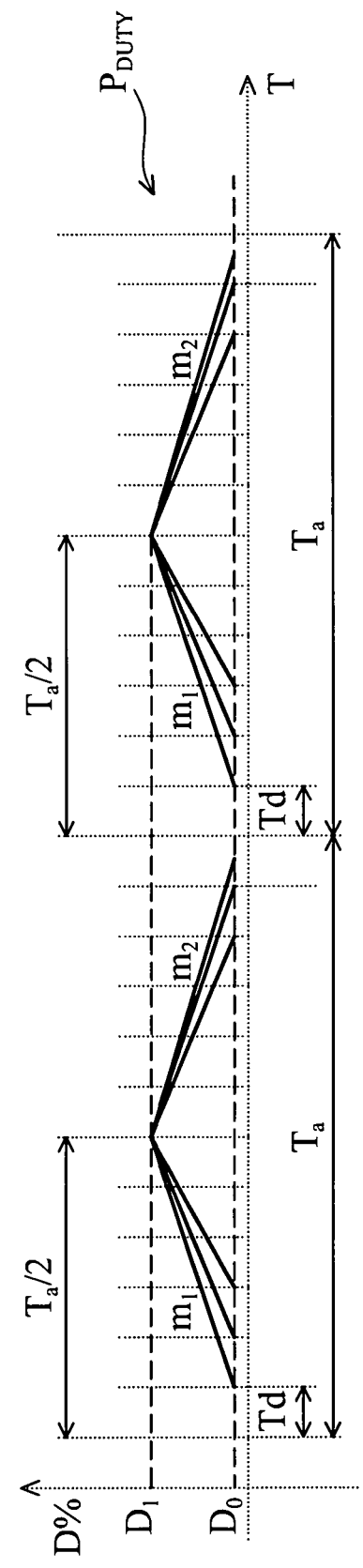
FIG. 7B is a waveform diagram of a duty-cycle signal according to a fifth embodiment of the invention.

FIGS. 7A and 7B show a fifth embodiment of the invention, wherein the duty-cycle signal $P_{DUTY}$ is a triangle wave. Unlike the fourth embodiment, the slope value $m_1$ of the rising segment of the duty-cycle signal $P_{DUTY}$ is different from the slope value $m_2$ of the falling segment of the duty-cycle signal $P_{DUTY}$, wherein the slope values $m_1$ and $m_2$ can be obtained by the following formula:

$$m=(D_1-D_0)/(T_a/2-T_d) \text{ and } m_2 \text{ is } m_1 \text{ plus an adjustment};$$

wherein $T_a$ is the half period of the phase signal $P_{PULSE}$, $T_d$ is a constant between 0 to $T_a/2$, and the first duty cycle $D_0$ and second duty cycle $D_1$ are fixed values between 0%~100% and $D_1>D_0$.

In this embodiment, the slope value of the duty-cycle signal $P_{DUTY}$ is adjusted for different motors. Also, it is noted that the slope value $m_1$ is not limited to exceeding the slope value $m_2$. However, when the phase signal $P_{PULSE}$ changes phase, the duty cycle represented by the duty-cycle signal $P_{DUTY}$ is the first duty cycle $D_0$, ensuring noise and current pulses are not generated due to counter-electromotive force and motor torque.

Figure 8A:
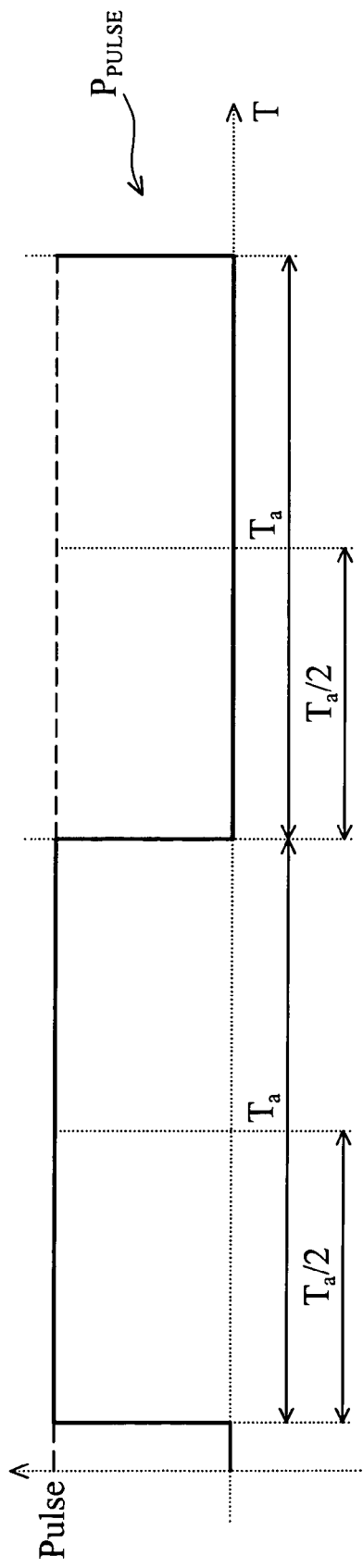
FIG. 8A is a waveform diagram of a phase signal fed back by a motor.
Figure 8B:
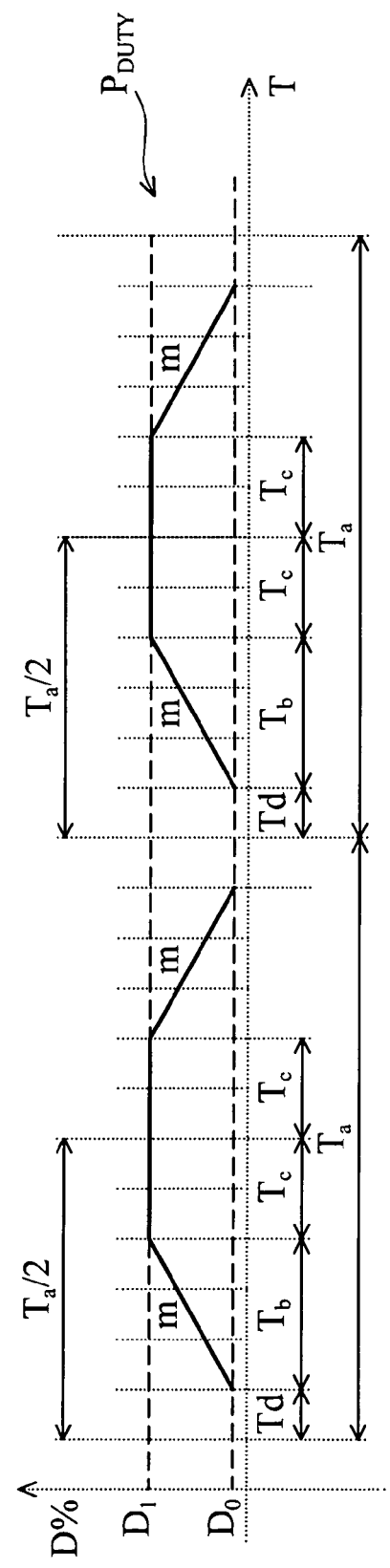

FIGS. 8A and 8B show a sixth embodiment of the invention, wherein the duty-cycle signal $P_{DUTY}$ is a trapezoidal wave. Unlike the second embodiment, the duty-cycle signal $P_{DUTY}$ holds at the first duty cycle $D_0$ for an interval $T_d$, and increases to the second duty cycle $D_1$. It then decreases from the second duty cycle $D_1$ to the first duty cycle $D_0$ and holds for an interval.

It is noted that the slope value of the rising segment of the duty-signal $P_{DUTY}$ equals that of the falling segment of the duty-signal $P_{DUTY}$, and is represented by the following formula:

$$m=(D_1-D_0)/(T_a/2-T_d-T_c);$$

wherein $T_a$ is the half period of the phase signal $P_{PULSE}$, $T_d$ is a constant between 0 and $T_a/2$, and the first duty cycle $D_0$ and second duty cycle $D_1$ are fixed values between 0%~100% and $D_1>D_0$.

In this embodiment, when the duty-cycle signal $P_{DUTY}$ holds when reaching the second duty cycle $D_1$ and the programmable IC determines if an interval $T_a/2$ has passed; if so, this interval is defined as interval $T_c$ and the duty-cycle signal $P_{DUTY}$ holds for another interval $T_c$. The duty-cycle signal $P_{DUTY}$ then decreases from the second duty cycle $D_1$ to the first duty cycle $D_0$.

Such design can be utilized for motor speed control different from that in the second embodiment. However, when the phase signal $P_{PULSE}$ changes phase, the duty cycle must be decreased to the first duty cycle $D_0$, ensuring the performance control.

FIGS. 9A and 9B show a seventh embodiment of the invention, wherein the duty-cycle signal $P_{DUTY}$ is a triangle wave. Unlike the fourth embodiment, the turning point of the duty-cycle signal $P_{DUTY}$ is at a medium speed duty cycle $D_n$ which is a value between the first and second duty cycles $D_0$ and $D_1$. The slope value m can be represented by the following formula:

$$m=(D_n-D_0)/(T_a/2-T_d);$$

wherein $T_a$ is the half period of the phase signal $P_{PULSE}$, $T_d$ is a constant between 0 and $T_a/2$, and the first duty cycle $D_0$ and duty cycle $D_n$ are fixed values between 0%~100% and $D_n>D_0$.

This duty cycle design can be utilized for motor speed control unlike that in the fourth embodiment. However, when the phase signal $P_{PULSE}$ changes phase, the duty cycle duty cycle must be decreased to the first duty cycle $D_0$, ensuring the performance control.

FIGS. 10A and 10B show an eighth embodiment of the invention, wherein the duty-cycle signal $P_{DUTY}$ is a trapezoidal wave. Unlike the sixth embodiment, the programmable IC determines if the interval $T_a/2-T_e$ passes at a timing point. If so, the interval from where the duty cycle presented by the duty-cycle signal $P_{DUTY}$ reaches the second duty cycle $D_1$ to the timing point is defined as interval $T_c$, wherein $T_e$ is defined by the programmable IC. Thus, the slope value of the duty-cycle signal $P_{DUTY}$ which increases from first duty cycle $D_0$ to the second duty cycle $D_1$ can be represented by the following formula:

$$m=(D_1-D_0)/(T_a/2-T_d-T_c-T_e);$$

wherein $T_a$ is the half period of the phase signal $P_{PULSE}$, $T_d$ is a constant between 0 and $T_a/2$, and the first duty cycle $D_0$ and second duty cycle $D_1$ are fixed values between 0%~100% and $D_1>D_0$.

In this embodiment, the slope value of the duty cycle represented by the duty-cycle signal $P_{DUTY}$ which decreases from the second duty cycle $D_1$ to the first duty cycle $D_0$ equals that of the duty cycle represented by the duty-cycle signal $P_{DUTY}$ which increases from the first duty cycle $D_0$ to the second duty cycle $D_1$.

Further, when reaching the second duty cycle $D_1$ from the first duty cycle $D_0$, the duty-cycle signal $P_{DUTY}$ holds for an interval $T_c$. The programmable IC determines if the holding time reaches $T_c$; if so, the duty-cycle signal $P_{DUTY}$ proceeds to hold for another interval $T_c$. The duty-cycle signal $P_{DUTY}$ then decreases from the second duty cycle $D_1$ to the first duty cycle $D_0$.

This embodiment reduces the interval that the duty-cycle signal $P_{DUTY}$ holds at the second duty cycle $D_1$ but increases the holding time at the first duty cycle $D_0$. This design can be utilized for motor speed control unlike that in the sixth embodiment. However, when the phase signal $P_{PULSE}$ changes phase, the duty-cycle signal $P_{DUTY}$ must be decreased to the first duty cycle $D_0$, ensuring the performance control.

FIGS. 11A and 11B show a ninth embodiment of the invention, wherein the duty-cycle signal $P_{DUTY}$ is a triangle wave. Unlike the seventh embodiment, the turning point of the duty-cycle signal $P_{DUTY}$ is advanced for an interval $T_e$ defined by the programmable IC. Thus the slope value of the duty-cycle signal $P_{DUTY}$, which increases from the first duty cycle $D_0$ to a medium speed duty cycle $D_n$ can be represented by the following formula:

$$m=(D_n-D_0)/(T_d/2-T_d-T_e);$$

wherein $T_a$ is the half period of the phase signal $P_{PULSE}$, $T_d$ is a constant between 0 and $T_a/2$, and the first duty cycle $D_0$ and duty cycle $D_n$ are fixed values between 0%~100% and $D_n>D_0$.

It is noted that the slope value of the duty-cycle signal $P_{DUTY}$ which decreases from the duty cycle $D_n$ to the first duty cycle $D_0$ equals that of the duty-cycle signal $P_{DUTY}$ which increases from the first duty cycle $D_0$ to the duty cycle $D_n$.

In this embodiment, the turning point of the duty-cycle signal $P_{DUTY}$ is advanced so that the interval that the duty-cycle signal $P_{DUTY}$ holds at the first duty cycle $D_0$ after decreasing exceeds that before increasing. This design can be utilized for motor speed control unlike that in the seventh embodiment. However, when the phase signal $P_{PULSE}$ changes phase, the duty-cycle signal $P_{DUTY}$ must be decreased to the first duty cycle $D_0$, ensuring the performance control.

FIGS. 12A and 12B show a tenth embodiment of the invention, wherein the duty-cycle signal $P_{DUTY}$ is a trapezoidal wave. Unlike the eighth embodiment, the programmable IC herein determines if the interval $T_a/2+T_e$ passes. If so, the duty-cycle signal $P_{DUTY}$ holds for an interval $T_c$ and then decreases to the first duty cycle $D_0$, wherein $T_e$ is an interval defined by the programmable IC. Thus, the slope value of the duty-cycle signal $P_{DUTY}$ which increases from first duty cycle $D_0$ to the second duty cycle $D_1$ is represented by the following formula:

$$m=(D_1-D_0)/(T_a/2-T_d-(T_c-T_e);$$

wherein $T_a$ is the half period of the phase signal $P_{PULSE}$, $T_d$ is a constant between 0 and $T_a/2$, and the first duty cycle $D_0$ and second duty cycle $D_1$ are fixed values between 0%~100% and $D_1>D_0$.

In this embodiment, the slope value of the duty-cycle signal $P_{DUTY}$ which decreases from the second duty cycle $D_1$ to the first duty cycle $D_0$ equals that of the duty-cycle signal $P_{DUTY}$ which increases from the first duty cycle $D_0$ to the second duty cycle $D_1$.

This embodiment reduces the holding time of the duty-cycle signal $P_{DUTY}$ at the second duty cycle $D_1$ but increases the holding time at the first duty cycle $D_0$. This design can be utilized for motor speed control unlike that in the eighth embodiment. However, when the phase signal $P_{PULSE}$ changes phase, the duty-cycle signal $P_{DUTY}$ must be decreased to the first duty cycle $D_0$, ensuring the performance control.

FIGS. 13A and 13B show a eleventh embodiment of the invention, wherein the duty-cycle signal $P_{DUTY}$ is a triangle wave. Unlike the ninth embodiment, the turning point of the duty-cycle signal $P_{DUTY}$ lags for an interval $T_e$, defined by the programmable IC. Thus the slope value of the duty-cycle signal $P_{DUTY}$ which increases from the first duty cycle $D_0$ to a medium speed duty cycle $D_n$ can be represented by the following formula:

$$m=(D_n-D_0)/(T_d/2-T_d+T_e);$$

wherein $T_a$ is the half period of the phase signal $P_{PULSE}$, $T_d$ is a constant between 0 and $T_a/2$, and the first duty cycle $D_0$ and duty cycle $D_n$ are fixed values between 0%~100% and $D_n>D_0$.

It is noted that the slope value of the duty-cycle signal $P_{DUTY}$ which decreases from the duty cycle $D_n$ to the first duty cycle $D_0$ equals that of the duty-cycle signal $P_{DUTY}$ which increases from the first duty cycle $D_0$ to the duty cycle $D_n$.

The control method of this embodiment makes the holding time of the first duty cycle $D_0$ before increasing more than the holding time of the first duty cycle $D_0$ after decreasing by delaying an interval $T_e$. This design can be utilized for motor speed control unlike that in the ninth embodiment. However, when the phase signal $P_{PULSE}$ changes phase, the duty-cycle signal $P_{DUTY}$ must be decreased to the first duty cycle $D_0$, ensuring the performance control.

FIGS. 14A and 14B show a twelfth embodiment of the invention, wherein the duty-cycle signal $P_{DUTY}$ is a sinusoidal wave. Unlike the third embodiment, the duty-cycle signal $P_{DUTY}$ holds at the first duty cycle $D_0$ for an interval $T_d$ and increases to the second duty cycle $D_1$ and then decreases to the first duty cycle $D_0$. It is noted that after decreasing from the second duty cycle $D_1$ to the first duty cycle $D_0$, the duty-cycle signal $P_{DUTY}$ holds for an interval $T_d$ before increasing to the second duty cycle $D_1$ again.

It is noted that in this embodiment, the slope value of the duty-cycle signal $P_{DUTY}$ which increases from the first duty cycle $D_0$ to the second duty cycle $D_1$ and that of the duty-cycle signal $P_{DUTY}$ which decreases from the second duty cycle $D_1$ to the first duty cycle $D_0$ are different with respect to a plurality of time intervals. It is assumed that there are a plurality of time intervals $T_1, T_2, \ldots, T_n$ and a plurality of corresponding slope values $m_1, m_2, \ldots, M_n$ which can be represented by the following formula:

$$m=(D_1-D_0)*\{\sin[(\pi/2)*(k/n)]\};$$

wherein $k=1, 2, 3, \ldots n$, $T_d$ is a constant between 0 and $T_a/2$, and the first duty cycle $D_0$ and duty cycle $D_n$ are fixed values between 0%~100% and $D_n>D_0$.

This embodiment can be utilized for motor speed control unlike that in the third embodiment. However, when the phase signal $P_{PULSE}$ changes phase, the duty cycle signal $P_{DUTY}$ is delayed for the interval of two $T_d$, ensuring noise and current pulses are not generated due to counter-electromotive force and motor torque, thus obtaining the same performance as the third embodiment.

FIGS. 15A and 15B show a thirteenth embodiment of the invention, wherein the duty-cycle signal $P_{DUTY}$ is a sinusoidal wave. Unlike the twelfth embodiment, the duty-cycle signal $P_{DUTY}$ shifts for a shift $D_{diff}$ in the second changing direction point of the phase signal $P_{PULSE}$. In this way, the programmable IC can determine the value of the shift $D_{diff}$, adjusting the slope of the duty-cycle signal $P_{DUTY}$ and the duty cycle it represents.

The slope value of the duty-cycle signal $P_{DUTY}$ in this embodiment can be calculated by the following formula:

$$m_k=(D_n-D_0)*\{\sin[(\pi/2)*(k/n)]\};$$

wherein k=1, 2, 3, . . . n, $T_d$ is a constant between 0 and $T_a/2$, and the duty cycle $D_0$ is a fixed value between 0%~100% and $D_0<D_n$. The duty cycle $D_{diff}$ is a fixed value between 0%~100%.

This embodiment can be utilized for motor speed control unlike that in the twelfth embodiment. However, when the phase signal $P_{PULSE}$ changes phase, it must be ensured that noise and current pulses are not generated due to counter-electromotive force and motor torque, thus obtaining the same performance of the twelfth embodiment.

FIGS. 16A and 16B show a fourteenth embodiment of the invention, wherein the duty-cycle signal $P_{DUTY}$ is a step wave. Unlike the twelfth embodiment, the duty-cycle signal $P_{DUTY}$ within a certain time interval $(T_1, T_2, \ldots, T_n)$ is fixed $(Da_1, Da_2 \ldots, Da_n)$. Such method can be utilized for motor speed control unlike that in the twelfth embodiment. However, when the phase signal $P_{PULSE}$ changes phase, the duty-cycle signal $P_{DUTY}$ must be decreased to the first duty cycle $D_0$, ensuring the performance control.

FIGS. 17A and 17B show a fifteenth embodiment of the invention, wherein the duty-cycle signal $P_{DUTY}$ here is a non-regular wave. This control method can be utilized for motor speed control unlike that in the previous embodiments. However, when the phase signal $P_{PULSE}$ changes phase, the duty-cycle signal $P_{DUTY}$ must be decreased to the first duty cycle $D_0$, ensuring the control performance.

FIGS. 18A and 18B show a sixteenth embodiment of the invention, wherein the duty-cycle signal $P_{DUTY}$ is a trapezoidal wave. Unlike the sixth embodiment, the coefficients herein are adjustable. In this embodiment, the second duty cycle $D_1$ is adjusted between $D_0$~100%, and intervals $T_a$ and $T_b$ are changed. It is noted that increasing the second duty cycle $D_1$ increases the speed and decreases the interval $T_a$; conversely, decreasing the second duty cycle $D_1$ decreases the speed and increases the interval $T_a$. Further, the ratio between $T_b$ and $T_a$ is usually fixed, i.e. $M=T_b/T_a$ and M is fixed, thus, $T_b$ changes in accordance with $T_a$.

Moreover, the ratio M can be adjusted in accordance with design necessity, obtaining different duty cycle signals $P_{DUTY}$. For example, if the ratio M is ½, i.e. $T_b$ is half $T_a$, the duty cycle signal $P_{DUTY}$ is a triangle wave and the motor rotates at a lowest speed. If the ratio M is 0, i.e. $T_b$ is zero, the duty cycle signal $P_{DUTY}$ is a square wave as in FIG. 18A and the motor rotates at a high speed. However, in this case, the duty-cycle signal $P_{DUTY}$ may not be decreased to the first duty cycle $D_0$, when the phase signal $P_{PULSE}$ changes phase. In practice, the ratio M is not zero but usually a value between 0~½, allowing the duty cycle signal $P_{DUTY}$ to rise and fall and equals the first duty cycle $D_0$ when changing direction.

The described motor control method can be utilized in the following hardware circuits.

FIG. 19 shows a first hardware circuit utilizing the motor control device of the invention, wherein a programmable IC is built in a motor control device 10. The motor control device 10 receives a phase signal $P_{PULSE}$ generated by a Hall element 20, a comparative signal $P_{COM}$ generated by a detector 30 after detecting temperature, and a pulse width modulation (PWM) signal $P_{PWM}$ generated by a PWM generator 40. The programmable IC is capable of adjusting the duty cycle of the PWM signal $P_{PWM}$, generating a duty-cycle signal $P_{DUTY}$ to a full bridge coil switching circuit 50 which inputs the duty-cycle signal $P_{DUTY}$ to a coil 60 of a motor (not shown) accordingly, allowing the coil 60 to switch current directions in two neighboring phases, maintaining rotation of the motor.

FIG. 20 shows a second hardware circuit utilizing the motor control device of the invention, wherein the connection between the motor control device 10 and the coil switching circuit 50 is different from that of the first embodiment. However, it still can obtain similar performance, and thus is not described further.

FIG. 21 shows a third hardware circuit utilizing the motor control device of the invention, wherein, unlike the first embodiment, the motor control device 10 connects to a half bridge coil switching circuit 50. This design still can obtain similar performance, and thus is not described further.

FIG. 22 shows a fourth hardware circuit utilizing the motor control device of the invention, wherein unlike the first embodiment, there is no Hall element 20; conversely, the coil switching circuit 50 feeds a phase signal $P_{PULSE}$ directly back to the motor control device 10. This design still can obtain similar performance, and thus is not described further.

FIG. 23 shows a fifth hardware circuit utilizing the motor control device of the invention, wherein unlike previous embodiments, the motor control device 10 comprises a driving circuit 11 and a programmable IC 12. The programmable IC 12 receives the phase signal $P_{PULSE}$ from the Hall element 20, the comparative signal $P_{COM}$ from the detector 30 and a PWM signal $P_{PWM}$, generating the duty-cycle signal $P_{DUTY}$ to the driving circuit 11 to control the coil switching circuit 50.

FIG. 24 shows a sixth hardware circuit utilizing the motor control device of the invention, wherein unlike described embodiments, the motor control device 10 of this embodiment connects to a plurality of fans 70 with motors. Since noise generated in a single motor is reduced, this advantage is more obvious in the fans 70.

While the invention has been described by way of example and in terms of preferred embodiment, it is to be understood that the invention is not limited thereto. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A motor control method utilizing a programmable integrated circuit (IC) to control a motor, comprising:
   receiving a phase signal generated in accordance with the rotation phase of a coil of the motor;
   generating a duty-cycle signal in accordance with the period of the phase signal, wherein when the phase signal is changed, the value of the duty-cycle signal is a first duty cycle allowing the input power of the motor remain at a minimum.

2. The motor control method of claim 1, wherein the duty-cycle signal comprises a second duty cycle which is the duty cycle of the duty-cycle signal when the input power of the motor is the maximum, wherein the first duty cycle is between the second duty cycle and 0% and when the duty-cycle signal approaches 100%, the input power of the motor exceeds that when the duty cycle signal approaches 0%.

3. The motor control method of claim 1, wherein the duty-cycle signal comprises a second duty cycle which is the duty cycle of the duty-cycle signal when the input power of the motor is the maximum, wherein the first duty cycle is between the second duty cycle and 100%, and when the duty cycle signal approaches 100%, the input power of the motor is less than that when the duty cycle signal approaches 0%.

4. The motor control method of claim 1, wherein the phase of the phase signal leads, lags behind or is consistent with the rotation phase of the coil.

5. The motor control method of claim 1, wherein a Hall element is disposed between the programmable IC and the motor for receiving a feedback signal from the motor to generate the phase signal to the programmable IC.

6. The motor control method of claim 1, wherein the phase signal is input externally.

7. The motor control method of claim 1, wherein the duty-cycle signal comprises a rising segment and a falling segment, and both the value of the starting point of the rising segment and the value of the terminal point of the falling segment are the first duty cycle.

8. The motor control method of claim 7, wherein the duty-cycle signal is triangle wave, trapezoidal wave or sinusoidal wave.

9. The motor control method of claim 8, wherein the duty-cycle signal comprises a second duty cycle, a turning point between the rising and falling segments, and allows the input power of the motor remain at the maximum.

10. The motor control method of claim 9, wherein the second duty cycle is adjustable wherein increasing the second duty cycle increases the speed of the motor and decreasing the second duty cycle decreases the speed of the motor.

11. The motor control method of claim 10, wherein modulating the second duty cycle changes the intervals of the rising and falling segments.

12. The motor control method of claim 9, wherein when the phase signal is changed, the duty-cycle signal holds for an interval before the rising segment and holds for the interval after the falling segment.

13. The motor control method of claim 8, wherein an adjustment is added to the slope of the rising segment of the duty-cycle signal or the falling segment of the duty-cycle signal.

14. The motor control method of claim 12, wherein the turning point of the duty-cycle signal is advanced or delayed.

15. The motor control method of claim 9, wherein when the duty-cycle signal is a trapezoidal wave, the duty-cycle signal holds after increasing to a second duty cycle and then starts to decrease, wherein the second duty cycle is the duty cycle, allowing the input power of the motor remain at the maximum.

16. The motor control method of claim 15, wherein decreasing the holding time of the duty-cycle signal at the second duty cycle increases the holding time of the duty-cycle signal after the rising and falling segments.

17. The motor control method of claim 8, wherein when the duty-cycle signal is a sinusoidal wave, the duty-cycle signal subtracts a shift, generating different slopes and duty cycles.

18. The motor control method of claim 1, wherein the duty-cycle signal is a stepping wave, wherein the duty cycle within any time interval of the duty-cycle signal is fixed.

19. The motor control method of claim 1, wherein the duty-cycle signal is a non-regular wave.

20. A motor control device for driving a motor, comprising:

a programmable integrated circuit (IC) receiving a phase signal generated when a coil of the motor rotates, and generating a duty-cycle signal to control rotation of the coil;

wherein when the phase signal is changed, the value of the duty-cycle signal is a first duty cycle, allowing the input power of the motor remain at a minimum.

21. The motor control device of claim 20, wherein the duty-cycle signal comprises a second duty cycle, wherein the first duty cycle is between the second duty cycle and 0%, and when the duty cycle signal approaches 100%, the input power of the motor exceeds that when the duty cycle signal approaches 0%.

22. The motor control device of claim 20, wherein the duty-cycle signal comprises a second duty cycle, wherein the first duty cycle is between the second duty cycle and 100%, and when the duty cycle signal approaches 100%, the input power of the motor is less than that when the duty cycle signal approaches 0%.

23. The motor control device of claim 20, wherein the duty-cycle signal comprises a rising segment and a falling segment, and both the values of the starting point of the rising segment and the terminal point of the falling segment are the first duty cycle.

24. The motor control device of claim 20, wherein the duty-cycle signal is triangle wave, trapezoidal wave, sinusoidal wave or non-regular wave.

25. The motor control device of claim 20, wherein the duty-cycle signal is a stepping wave, wherein the duty cycle within any time interval of the duty-cycle signal is fixed.

26. The motor control device of claim 20, wherein a coil switching circuit is disposed between the motor control device and the motor, inputting the duty-cycle signal to the coil accordingly, allowing the coil to switch current direction, thereby driving the motor.

27. The motor control device of claim 26, wherein the coil switching circuit is in full bridge mode or half bridge mode.

28. The motor control device of claim 20, wherein a Hall element is disposed between the motor control device and the motor for receiving a feedback signal from the motor to generate the phase signal to the programmable IC.

29. The motor control device of claim 28, wherein a pulse width modulation (PWM) signal generator is coupled to the motor control device for generating a PWM signal to the programmable IC, allowing the programmable IC to generate the duty-cycle signal in accordance with the PWM signal and the phase signal.

30. The motor control device of claim 29, wherein a detector is coupled to the motor control device for detecting a temperature to generate a comparative signal to the programmable IC, wherein the programmable IC generates the duty-cycle signal in accordance with the phase signal, the PWM signal and the comparative signal.

31. The motor control device of claim 20, further comprising a driving circuit, wherein the programmable IC inputs the duty-cycle signal to the motor via the driving circuit.

* * * * *